(12) United States Patent
Gao et al.

(10) Patent No.: US 9,988,505 B2
(45) Date of Patent: Jun. 5, 2018

(54) POLYETHYLENE COMPOSITIONS AND FILMS FORMED THEREFROM

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Dali Gao, Beijing (CN); Hongwei Shi, Beijing (CN); Shijun Zhang, Beijing (CN); Meifang Guo, Beijing (CN); Luqiang Yu, Beijing (CN); Jinliang Qiao, Beijing (CN); Ruxian Li, Beijing (CN); Yujing Tang, Beijing (CN); Jianjun Yin, Beijing (CN); Liangshi Wang, Beijing (CN); Honghong Huang, Beijing (CN); Qingquan Yang, Beijing (CN); Hao Zou, Beijing (CN); Jie Li, Beijing (CN); Liying Zhang, Beijing (CN); Hua Yin, Beijing (CN); Jianye Liu, Beijing (CN); Jingbo Shao, Beijing (CN); Mingfu Lyu, Beijing (CN); Liqiu Chu, Beijing (CN); Meng Xu, Beijing (CN); Hui Quan, Beijing (CN); Kai Xu, Beijing (CN); Mu Dong, Beijing (CN); Yun Lyu, Beijing (CN); Yihui Xu, Beijing (CN); Yaohui Xu, Beijing (CN); Peng Guo, Beijing (CN); Yiqing Bai, Beijing (CN)

(73) Assignees: China Petroleum & Chemical Corporation, Beijing (CN); Beijing Research Institute of Chemical Industry, China Petroleum and Chemical Corporation, Beijing (CN)

( * ) Notice: Subject to any disclaimer, the term of this patent is extended or adjusted under 35 U.S.C. 154(b) by 72 days.

(21) Appl. No.: 14/924,302

(22) Filed: Oct. 27, 2015

(65) Prior Publication Data

US 2016/0115285 A1    Apr. 28, 2016

(30) Foreign Application Priority Data

Oct. 27, 2014 (CN) .......................... 2014 1 0582434
Oct. 27, 2014 (CN) .......................... 2014 1 0582470
(Continued)

(51) Int. Cl.
B32B 27/32    (2006.01)
B32B 27/08    (2006.01)
(Continued)

(52) U.S. Cl.
CPC .................. *C08J 5/18* (2013.01); *B32B 27/08* (2013.01); *B32B 27/18* (2013.01); *B32B 27/32* (2013.01);
(Continued)

(58) Field of Classification Search
CPC ............... C08L 23/08; C08L 2205/025; C08L 2205/03; C08L 2203/30; C08L 2203/16;
(Continued)

(56) References Cited

U.S. PATENT DOCUMENTS 6,426,384 B1    7/2002 Nishimura et al.
2001/0016621 A1    8/2001 Lau
(Continued)

FOREIGN PATENT DOCUMENTS

CN    1541161 A    10/2004
CN    1543483 A    11/2004
(Continued)

OTHER PUBLICATIONS

Extended European Search Report from the European Patent Office for Application No. 15 19 1626 dated Mar. 17, 2016.
(Continued)

*Primary Examiner* — William Cheung
(74) *Attorney, Agent, or Firm* — Finnegan, Henderson, Farabow, Garrett & Dunner, LLP

(57) ABSTRACT

A polyethylene composition comprising an ethylene/α-olefin copolymerized linear low density polyethylene, wherein the polyethylene composition has a Mw of from 100,000 g/mol to 200,000 g/mol, a Mw/Mn of from 4.0 to 9.0, a Mz/Mw of from 4.0 to 7.0, and a Mz+1/Mw of from 4.5 to 13.5, is provided. A film formed of the polyethylene composition is also provided.

48 Claims, 1 Drawing Sheet

(30) Foreign Application Priority Data

| Oct. 27, 2014 | (CN) | 2014 1 0582551 |
| --- | --- | --- |
| Oct. 27, 2014 | (CN) | 2014 1 0582579 |
| Oct. 27, 2014 | (CN) | 2014 1 0583605 |
| Oct. 27, 2014 | (CN) | 2014 1 0583874 |
| Oct. 27, 2014 | (CN) | 2014 1 0583950 |
| Oct. 27, 2014 | (CN) | 2014 1 0584803 |
| Oct. 27, 2014 | (CN) | 2014 1 0584827 |
| Oct. 27, 2014 | (CN) | 2014 1 0584933 |

(51) Int. Cl.

| *C08L 23/00* | (2006.01) |
| --- | --- |
| *C08F 210/00* | (2006.01) |
| *C08J 5/18* | (2006.01) |
| *C08L 23/08* | (2006.01) |
| *B32B 27/18* | (2006.01) |

(52) U.S. Cl.
CPC ............ *B32B 27/327* (2013.01); *C08L 23/08* (2013.01); *B32B 2250/24* (2013.01); *B32B 2270/00* (2013.01); *B32B 2307/406* (2013.01); *B32B 2307/412* (2013.01); *B32B 2307/518* (2013.01); *B32B 2307/54* (2013.01); *B32B 2307/558* (2013.01); *B32B 2307/72* (2013.01); *B32B 2410/00* (2013.01); *B32B 2439/00* (2013.01); *B32B 2439/06* (2013.01); *B32B 2439/46* (2013.01); *C08J 2323/06* (2013.01); *C08J 2323/08* (2013.01); *C08L 2203/16* (2013.01); *C08L 2203/30* (2013.01); *C08L 2205/025* (2013.01); *C08L 2205/03* (2013.01)

(58) Field of Classification Search
CPC ...... C08J 5/18; C08J 2323/08; C08J 2323/06; B32B 27/32; B32B 27/08; B32B 27/18; B32B 27/327; B32B 2439/46; B32B 2439/06; B32B 2439/00; B32B 2307/518; B32B 2307/412; B32B 2307/54; B32B 2307/558; B32B 2307/72; B32B 2250/24; B32B 2270/00; B32B 2410/00
USPC ................... 428/220, 516; 525/240; 526/348
See application file for complete search history.

(56) References Cited

U.S. PATENT DOCUMENTS

| 2003/0000134 A1 | 1/2003 | Vibien |
| --- | --- | --- |
| 2010/0203277 A1* | 8/2010 | Michie, Jr. ............ C08F 210/16 428/36.92 |
| 2013/0144019 A1 | 6/2013 | Demirors et al. |
| 2013/0266786 A1 | 10/2013 | Malakoff et al. |
| 2013/0337210 A1 | 12/2013 | Aliyev et al. |
| 2014/0171605 A1 | 6/2014 | Aliyev |

FOREIGN PATENT DOCUMENTS

| CN | 1678678 A | 10/2005 |
| --- | --- | --- |
| CN | 1747997 A | 3/2006 |
| CN | 101291959 A | 10/2008 |
| CN | 101316871 A | 12/2008 |
| CN | 101935369 A | 1/2011 |
| CN | 102307915 A | 1/2012 |
| CN | 102844371 A | 12/2012 |
| CN | 103228685 A | 7/2013 |
| CN | 103254342 A | 8/2013 |
| CN | 104010816 A | 8/2014 |
| EP | 0 844 277 A1 | 5/1998 |
| WO | WO 01/98409 A1 | 12/2001 |
| WO | WO 02/00436 A2 | 1/2002 |
| WO | WO 03/016396 | 2/2003 |
| WO | WO 2004/022646 A1 | 3/2004 |
| WO | WO 2004/072176 A2 | 8/2004 |
| WO | WO 2006/114209 A1 | 11/2006 |
| WO | WO 2007/045315 A1 | 4/2007 |
| WO | WO 2010/091256 A1 | 8/2010 |
| WO | WO 2011/129956 A1 | 10/2011 |
| WO | WO 2012/044291 A1 | 4/2012 |
| WO | WO 2013/056466 A1 | 4/2013 |
| WO | WO 2014/154784 A1 | 10/2014 |

OTHER PUBLICATIONS

English Translation of "Table 2-7 Comparison of properties of LLDPE and properties of LDPE/HDPE" in *Practical Handbook of Printing Technology, vol. 3: Printing Tools*. Demao, Yue (Ed.) 1st ed., Printing Industry Publishing House, Apr. 30, 2010; p. 64.

* cited by examiner

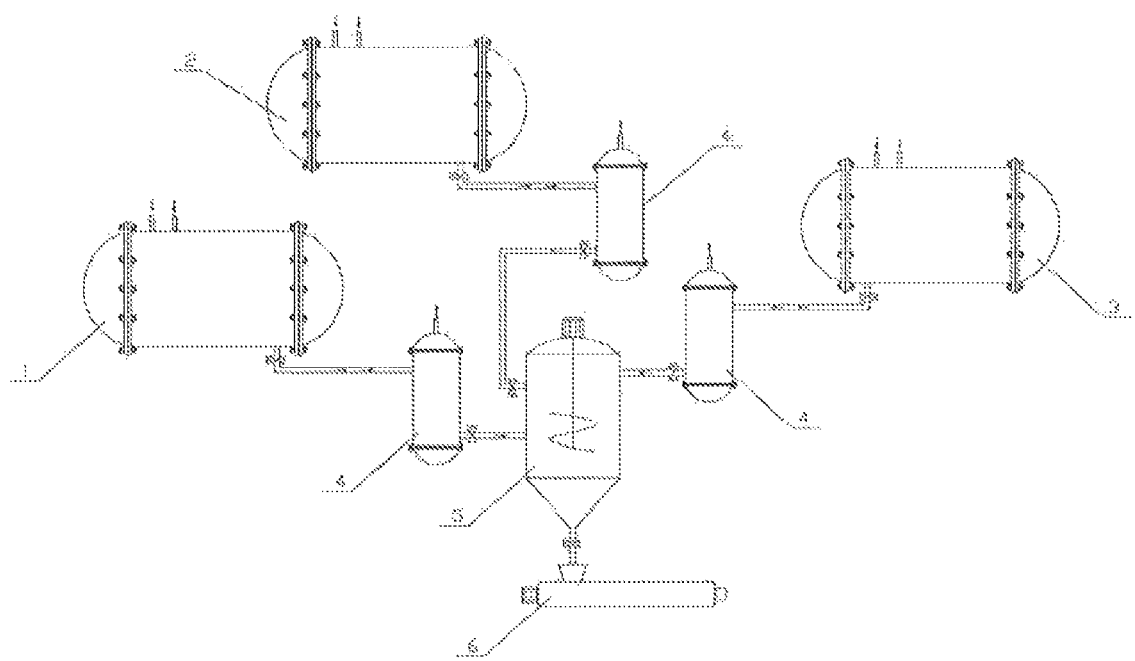

POLYETHYLENE COMPOSITIONS AND FILMS FORMED THEREFROM

The present application claims the benefit of the Chinese Patent Application Nos. 201410582434.7, 201410582470.3, 201410582551.3, 201410582579.7, 201410583605.8, 201410583874.4, 201410583950.1, 201410584803.6, 201410584827.1, and 201410584933.X, filed on Oct. 27, 2014, which are incorporated herein by reference in their entirety.

The present disclosure relates to polyethylene compositions and films formed therefrom.

Biaxially oriented polyethylene (BOPE) films include film materials shaped via biaxial orientation processes from polyethylene (PE) resins having a specific molecular structure. In the course of shaping the BOPE film, after the film has been stretched, PE macromolecule chain and crystalline structure are highly oriented so that the film has a significantly enhanced tensile strength, a reduced elongation at break, a low haze, high gloss and good transparency. In addition, compared with the polyethylene film products prepared by the known extruding-blowing processes or extruding-casting processes, BOPE films have advantages such as high mechanic strength, good puncturing resistance, good impact resistance, excellent optical performance, good energy conservation and environmental protection characteristics, etc. Thus, BOPE films can be widely used for packaging bag, heavy-duty packaging bag, vacuum heat sealing film, low-temperature packaging film, complex film, medical and hygienic products, agricultural film, and the like.

Many literatures including JP 2001026684, JP 2004238543, JP 3286831, CN200480026872.X, CN200910135778.2, U.S. Pat. No. 6,689,857, US20040220367, and US2006/0089477 disclose BOPE films.

The currently used biaxial orientation methods for producing plastic films include tenter frame processes and tubular stretching methods. The tenter frame processes have been used in the processing of some film materials such as polypropylene (PP), polyamide (PA), and polyethylene terephthalate (PET). Compared with tubular stretching methods, the tenter frame processes have larger stretch ratio (transverse direction stretch ratio may reach 10 times or more), quicker forming speed (the take-up speed may be up to several meters per minute), higher production efficiency, and give films having better mechanic strength, better optical performance and better thickness uniformity. However, in the tenter frame processes, the film formation is significantly influenced by the molecular structure of raw material, and the difficulty of the film stretching processing is large. As a consequence, the tenter frame processes impart higher requirements on the film raw material. Known raw materials for producing biaxially oriented polyethylene films are substantially suitable only to the tubular stretching methods. When used in the tenter frame processes to produce BOPE films, these polyethylene raw materials suffer from poor film forming performance, for example, very low stretching speed and stretch ratio, and ease of film fracture.

Therefore, there is a need for a polyethylene raw material that is suitable to the tenter frame processes to produce BOPE films.

The technical problems addressed by the present disclosure include overcoming the drawbacks, including poor film forming performance and ease of film fracture, suffered by the existing polyethylene raw materials in the production of polyethylene films through a tenter frame process.

The present disclosure solves the technical problems by providing novel polyethylene compositions.

In an embodiment, the present disclosure provides a polyethylene composition comprising an ethylene/α-olefin copolymerized linear low density polyethylene, wherein the polyethylene composition has a Mw of from 100,000 g/mol to 180,000 g/mol, a Mw/Mn of from 4.0 to 8.5, a Mz/Mw of from 4.0 to 6.5, and a Mz+1/Mw of from 4.5 to 12.5.

In another embodiment, the present disclosure provides a polyethylene composition comprising an ethylene/α-olefin copolymerized linear low density polyethylene, wherein the polyethylene composition has a Mw of from 100,000 g/mol to 200,000 g/mol, a Mw/Mn of from 4.5 to 9.0, a Mz/Mw of from 4.5 to 7.0, and a Mz+1/Mw of from 7.5 to 13.5.

In another embodiment, the present disclosure provides a polyethylene composition comprising an ethylene/α-olefin copolymerized linear low density polyethylene, wherein the polyethylene composition has a Mw of from 100,000 g/mol to 200,000 g/mol, a Mw/Mn of from 4.5 to 8.5, a Mz/Mw of from 4.5 to 6.5, and a Mz+1/Mw of from 7.5 to 13.0.

In another embodiment, the present disclosure provides a polyethylene composition comprising an ethylene/α-olefin copolymerized linear low density polyethylene, wherein the polyethylene composition has a Mw of from 100,000 g/mol to 180,000 g/mol, a Mw/Mn of from 4.0 to 8.0, a Mz/Mw of from 4.0 to 6.0, and a Mz+1/Mw of from 4.5 to 12.5.

In an embodiment, the present disclosure provides a polyethylene composition comprising component A, component C and optionally component B, wherein the component A comprises an ethylene/α-olefin copolymerized linear low density polyethylene having a melt index $MI_A$ of from 0.01 to 2 g/10 min and a density $\rho_A$ of from 0.880 to 0.936 g/cm$^3$; the component B comprises an ethylene/α-olefin copolymerized linear low density polyethylene having a melt index $MI_B$ of from 2.1 to 14.9 g/10 min and a density $\rho_B$ of from 0.910 to 0.930 g/cm$^3$; and the component C comprises an ethylene/α-olefin copolymerized linear low density polyethylene having a melt index $MI_C$ of from 15 to 150 g/10 min and a density $\rho_C$ of from 0.880 to 0.930 g/cm$^3$.

In another embodiment, the present disclosure provides a polyethylene composition comprising component A, component C and optionally component B, wherein the component A comprises an ethylene/α-olefin copolymerized linear low density polyethylene having a melt index $MI_A$ of from 0.01 to 3.5 g/10 min and a density $\rho_A$ of from 0.880 to 0.936 g/cm$^3$; the component B comprises an ethylene/α-olefin copolymerized linear low density polyethylene having a melt index $MI_B$ of from 3.6 to 9.9 g/10 min and a density $\rho_B$ of from 0.910 to 0.930 g/cm$^3$; and the component C comprises an ethylene/α-olefin copolymerized linear low density polyethylene having a melt index $MI_C$ of from 10 to 80 g/10 min and a density $\rho_C$ of from 0.880 to 0.930 g/cm$^3$.

In another embodiment, the present disclosure provides a polyethylene composition comprising component A, component C and optionally component B, wherein the component A comprises an ethylene/α-olefin copolymerized linear low density polyethylene having a melt index $MI_A$ of from 0.01 to 2 g/10 min and a density $\rho_A$ of from 0.880 to 0.936 g/cm$^3$; the component B comprises an ethylene/α-olefin copolymerized linear low density polyethylene having a melt index $MI_B$ of from 2.1 to 9.9 g/10 min and a density $\rho_B$ of from 0.910 to 0.930 g/cm$^3$; and the component C comprises an ethylene/α-olefin copolymerized linear low density polyethylene having a melt index $MI_C$ of from 10 to 80 g/10 min and a density $\rho_C$ of from 0.880 to 0.930 g/cm$^3$.

In another embodiment, the present disclosure provides a polyethylene composition comprising component A, component C and optionally component B, wherein the component A comprises an ethylene/α-olefin copolymerized linear low density polyethylene having a melt index $MI_A$ of from 0.01 to 3.5 g/10 min and a density $\rho_A$ of from 0.880 to 0.936 g/cm³; the component B comprises an ethylene/α-olefin copolymerized linear low density polyethylene having a melt index $MI_B$ of from 3.6 to 14.9 g/10 min and a density $\rho_B$ of from 0.910 to 0.930 g/cm³; and the component C comprises an ethylene/α-olefin copolymerized linear low density polyethylene having a melt index $MI_C$ of from 15 to 150 g/10 min and a density $\rho_C$ of from 0.880 to 0.930 g/cm³.

The inventors have found through an intensive study that when used to produce polyethylene films through tenter frame processes, the polyethylene compositions disclosed herein have advantages such as large stretch ratios and high film forming rates, can satisfy the high requirements of tenter frame processes on polyethylene raw material, and are adaptive to the existing flat-film stretching production line.

According to an embodiment of the present disclosure, in the polyethylene composition, the amount of component A, $W_A$, ranges from 25-90 parts by weight, the amount of component B, $W_B$, ranges from 0.1-10 parts by weight, and the amount of component C, $W_C$, ranges from 10-75 parts by weight. Such a polyethylene composition may have good film forming performance, and the films prepared from the polyethylene compositions may have low haze.

A further objective of the present disclosure is to provide a film comprising at least one polyethylene layer formed from the polyethylene composition disclosed herein.

These and other features and virtues of the disclosure will be apparent from the following descriptions in details.

BRIEF DESCRIPTION OF THE DRAWING

The FIGURE depicts schematically a multi-reactor parallel connection equipment useful in the preparation of the polyethylene composition disclosed herein.

DETAILED DESCRIPTION

Definitions

All of the molecular weights Mw, Mn, Mz, and Mz+1 as mentioned in the description and appended claims are measured by using gel permeation chromatography (GPC), such as high-temperature GPC.

As used herein, the term "molar content of α-olefin comonomer" is intended to mean the percentage by mole of α-olefin-derived units, based on the total mole number of both ethylene-derived units and α-olefin-derived units of a polyethylene composition or an ethylene/α-olefin copolymerized linear low density polyethylene.

Unless indicated otherwise, the melt indexes mentioned in the present description and the appended claims are measured according to GB/T3682-2000, at 190° C. under 2.16 kg load.

The inventors have found through an intensive study that in the production of a PE film from a polyethylene composition through a biaxially stretching method, by controlling the Mw of the polyethylene composition in a range of from 100,000 g/mol to 200,000 g/mol and, at the same time, controlling Mw/Mn in a range of from 4.0 to 9.0, Mz/Mw in a range of from 4.0 to 7.0, and Mz+1/Mw in a range of from 4.5 to 13.5, the polyethylene compositions, when used to produce polyethylene film through a flat-film biaxially stretching method, has advantages such as large stretch ratios and high film forming rates, thereby satisfying the high requirements of tenter frame processes on polyethylene raw materials.

In a first aspect, the present disclosure provides a polyethylene composition comprising an ethylene/α-olefin copolymerized linear low density polyethylene, wherein the polyethylene composition has a Mw of from 100,000 g/mol to 180,000 g/mol, preferably from 100,000 g/mol to 150,000 g/mol, a Mw/Mn of from 4.0 to 8.5, a Mz/Mw of from 4.0 to 6.5, and a Mz+1/Mw of from 4.5 to 12.5.

In some embodiments, the polyethylene composition has such a temperature rising elution curve, obtained by analytical temperature rising elution fractionation (TREF) method, that includes a high-temperature eluting peak and a low-temperature eluting peak, wherein the high-temperature eluting peak may appear at a temperature ranging from 90 to 105° C., such as a temperature ranging from 95 to 100° C., and the low-temperature eluting peak may appear at a temperature ranging from 50 to 90° C., such as a temperature ranging from 60 to 90° C., and wherein the area of the high-temperature eluting peak accounts for no more than 60%, such as no more than 50%, or from 5 to 45%, of the total area of the high-temperature eluting peak and the low-temperature eluting peak, and the area of the low-temperature eluting peak accounts for at least 40%, such as at least 50%, or from 55 to 95%, of the total area of the high-temperature eluting peak and the low-temperature eluting peak. Such a polyethylene composition may have good film forming performance, and films prepared from the polyethylene composition may have excellent mechanical properties and optical properties, such as low haze, high gloss, high tensile strength, and high puncture strength.

In some embodiments, the polyethylene composition has a melting temperature, measured by differential scanning calorimetry (DSC), in a range of from 100 to 130° C., such as from 105 to 128° C. Such a polyethylene composition may have good film forming performance, good casting processability, and high mechanical strengths.

In this aspect of the present disclosure, there is no specific limitation to the content of the α-olefin comonomer of the linear low density polyethylene. In some embodiments, the molar content of the α-olefin comonomer may range from 0.5 mol % to 20 mol %, such as from 2 mol % to 10 mol %.

In some embodiments of this aspect of the disclosure, the polyethylene composition comprises component A, component C, and optionally component B, wherein the component A comprises an ethylene/α-olefin copolymerized linear low density polyethylene having a melt index $MI_A$ of from 0.01 to 2 g/10 min and a density $\rho_A$ of from 0.880 to 0.936 g/cm³; the component B comprises an ethylene/α-olefin copolymerized linear low density polyethylene having a melt index $MI_B$ of from 2.1 to 9.9 g/10 min and a density $\rho_B$ of from 0.910 to 0.930 g/cm³; and the component C comprises an ethylene/α-olefin copolymerized linear low density polyethylene having a melt index $MI_C$ of from 10 to 80 g/10 min and a density $\rho_C$ of from 0.880 to 0.930 g/cm³.

In some embodiments, the component A has a melt index $MI_A$ of from 0.01 to 1.5 g/10 min, the component B has a melt index $MI_B$ of from 3 to 8 g/10 min, and the component C has a melt index $MI_C$ of from 10 to 60 g/10 min. In some embodiments, the component A has a melt index $MI_A$ of from 0.01 to 1 g/10 min, the component B has a melt index $MI_B$ of from 3 to 5 g/10 min, and the component C has a melt index $MI_C$ of from 10 to 40 g/10 min.

In some embodiments, the component A has a density $\rho_A$ of from 0.910 to 0.930 g/cm³, the component B has a density $\rho_B$ of from 0.913 to 0.928 g/cm³, and the component C has a density $\rho_C$ of from 0.905 to 0.928 g/cm$^3$. In some embodiments, the component A has a density $\rho_A$ of from 0.915 to 0.926 g/cm$^3$, the component B has a density $\rho_B$ of from 0.913 to 0.924 g/cm$^3$, and the component C has a density $\rho_C$ of from 0.910 to 0.926 g/cm$^3$. In some embodiments, the respective densities $\rho_A$, $\rho_B$ and $\rho_C$ of component A, component B and component C of the polyethylene composition satisfy: $-0.04 \leq \rho_A - \rho_B \leq 0.02$ and $-0.045 \rho_A - \rho_C \leq 0.02$. The polyethylene composition disclosed herein may have not only good film forming performance but also very high tensile strength, very high puncture strength and low haze.

All of component A, component B, and component C may independently comprise an ethylene/α-olefin copolymerized linear low density polyethylene. As used herein, the term "linear" is intended to mean that the molecule chains contain only short branched chains, but no long branched chains and crosslinked structure. The "linear" characteristics of the polyethylene are resulted from the polymerized monomers and polymerization process conditions, and this is well known by a person skilled in the art. There is no specific limitation to the content of the α-olefin comonomer of component A, component B and component C. In some embodiments, the molar contents of the α-olefin comonomer in component A, component B and component C may each independently range from 0.2 mol % to 15 mol %, such as from 1.5 mol % to 10 mol %.

In an embodiment of this aspect where the polyethylene composition comprises the aforesaid component A, component B, and component C, the amount of component A, $W_A$, ranges from 25 to 90 parts by weight, the amount of component B, $W_B$, ranges from 0.1 to 10 parts by weight, and the amount of component C, $W_C$, ranges from 10 to 75 parts by weight. In some embodiments, the amount of component A, $W_A$, ranges from 30 to 80 parts by weight, the amount of component B, $W_B$, ranges from 0.5 to 8 parts by weight, and the amount of component C, $W_C$, ranges from 20 to 70 parts by weight. By having the amounts of components A, B and C in the above-mentioned ranges, the resultant polyethylene composition may have good film forming performance and, at the same time, good mechanical properties and optical properties. Further, in some embodiments, the amount of component A, $W_A$, the amount of component C, $W_C$, and the melt index of component A, $MI_A$, satisfy: $5.2 \times \lg MI_A + 11.6 \geq W_A / W_C \geq 0.9 \times \lg MI_A + 2.1$, such as: $2.9 \times \lg MI_A + 6.8 \geq W_A / W_C \geq 1.1 \times \lg MI_A + 2.7$. The polyethylene composition disclosed herein may have a large stretch ratio and a high stretching speed when it is processed through flat-film biaxially stretching methods.

In an embodiment of this aspect where the polyethylene composition comprises the aforesaid component A, component B, and component C, the polyethylene composition has a melt index of from 0.1 to 20 g/10 min, such as from 0.5 to 10 g/10 min. By having the melt index of the polyethylene composition as a whole within the aforesaid ranges, the polyethylene composition may have simultaneously excellent film forming performance, high tensile strength, high puncture strength, and low haze.

In this aspect of the present disclosure, there is no specific limitation to the content of component B. However, the content of component B, $M_B$, may be no more than 35 wt %, such as no more than 25 wt %, based on the total weight of the polyethylene composition.

In an embodiment, the component A and component B have, each independently, a molecular weight distribution index $M_w/M_n$ of no more than 4.5, such as in a range of from 2.0 to 4.2, and the component C has a molecular weight distribution index $M_w/M_n$ of no more than 8.0, such as in a range of from 3.5 to 6.0. Component A and component B having the aforesaid molecular weight distribution indexes may be produced by polymerization using a metallocene catalyst, and component C having the aforesaid molecular weight distribution index may be produced by polymerization using a Ziegler-Natta catalyst. The metallocene catalyst may be any of those commonly used in the art, and it may comprise a metallocene compound, an organic aluminum compound and optionally an electron donor, as well known by a person skilled in the art. The Ziegler-Natta catalyst may be any of those commonly used in the art, and it may comprise a magnesium and titanium-based component, an organic aluminum compound and optionally an electron donor, as well known by a person skilled in the art. The inventors have found that, by using in combination component A and component B, such as those having the above-specified melt indexes and densities and prepared by the metallocene catalyzed polymerization, and component C, such as those having the above-specified melt index and density and prepared by the Ziegler-Natta catalyzed polymerization, the resultant ethylene composition may have good film forming performance, and the resultant film may have very high strength and puncturing resistance and therefore is suitable for packaging application.

In a second aspect, the present disclosure provides a polyethylene composition comprising an ethylene/α-olefin copolymerized linear low density polyethylene, wherein the polyethylene composition has a Mw of from 100,000 g/mol to 200,000 g/mol, such as from 100,000 g/mol to 160,000 g/mol, a Mw/Mn of from 4.5 to 9.0, a Mz/Mw of from 4.5 to 7.0, and a Mz+1/Mw of from 7.5 to 13.5.

In some embodiments, the polyethylene composition has such a temperature rising elution curve, obtained by analytical temperature rising elution fractionation (TREF) method, that includes a high-temperature eluting peak and a low-temperature eluting peak, wherein the high-temperature eluting peak may appear at a temperature ranging from 90 to 110° C., such as a temperature ranging from 95 to 105° C., and the low-temperature eluting peak may appear at a temperature ranging from 50 to 90° C., such as a temperature ranging from 60 to 90° C., and wherein the area of the high-temperature eluting peak accounts for no more than 80%, such as no more than 70%, or from 10 to 60%, of the total area of the high-temperature eluting peak and the low-temperature eluting peak, and the area of the low-temperature eluting peak accounts for at least 20%, such as at least 30%, or from 40 to 90%, of the total area of the high-temperature eluting peak and the low-temperature eluting peak. Such a polyethylene composition may have good film forming performance, and a film prepared from the polyethylene composition may have excellent mechanical properties and optical properties.

In some embodiments, the polyethylene composition has a melting temperature, measured by differential scanning calorimetry (DSC), ranging from 100 to 130° C., and such as from 110 to 128° C. Such a polyethylene composition may have good film forming performance, good casting processability, and high mechanical strengths.

In this aspect of the present disclosure, there is no specific limitation to the content of the α-olefin comonomer of the linear low density polyethylene. In some embodiments, the molar content of the α-olefin comonomer ranges from 0.5 mol % to 20 mol %, such as from 2 mol % to 10 mol %. As used herein, the term "molar content of α-olefin comonomer" is intended to mean the percentage by mole of α-olefin-derived units, based on the total mole number of both ethylene-derived units and α-olefin-derived units.

In some embodiments of this aspect of the disclosure, the polyethylene composition comprises component A, component C, and optionally component B, wherein the component A comprises an ethylene/α-olefin copolymerized linear low density polyethylene having a melt index $MI_A$ of from 0.01 to 3.5 g/10 min and a density $\rho_A$ of from 0.880 to 0.936 g/cm³; the component B comprises an ethylene/α-olefin copolymerized linear low density polyethylene having a melt index $MI_B$ of from 3.6 to 9.9 g/10 min and a density $\rho_B$ of from 0.910 to 0.930 g/cm³; and the component C comprises an ethylene/α-olefin copolymerized linear low density polyethylene having a melt index $MI_C$ of from 10 to 80 g/10 min and a density $\rho_C$ of from 0.880 to 0.930 g/cm³.

In some embodiments, the component A has a melt index $MI_A$ of from 0.01 to 3 g/10 min, the component B has a melt index $MI_B$ of from 4 to 8 g/10 min, and the component C has a melt index $MI_C$ of from 10 to 60 g/10 min. In some embodiments, the component A has a melt index $MI_A$ of from 0.01 to 2 g/10 min, the component B has a melt index $MI_B$ of from 4 to 5 g/10 min, and the component C has a melt index $MI_C$ of from 15 to 40 g/10 min.

In some embodiments, the component A has a density $\rho_A$ of from 0.910 to 0.930 g/cm³, the component B has a density $\rho_B$ of from 0.913 to 0.928 g/cm³, and the component C has a density $\rho_C$ of from 0.905 to 0.928 g/cm³. In some embodiments, the component A has a density $\rho_A$ of from 0.915 to 0.926 g/cm³, the component B has a density $\rho_B$ of from 0.913 to 0.924 g/cm³, and the component C has a density PC of from 0.910 to 0.926 g/cm³. In some embodiments, the respective densities $\rho_A$, $\rho_B$ and $\rho_C$ of component A, component B and component C of the polyethylene composition satisfy: $-0.045 \leq \rho_A - \rho_B 0.02$ and $-0.04 \leq \rho_A - \rho_C \leq 0.02$. The resultant polyethylene composition may have not only good film forming performance but also very high tensile strength, very high puncture strength and low haze.

All of component A, component B, and component C may independently comprise an ethylene/α-olefin copolymerized linear low density polyethylene. As used herein, the term "linear" is intended to mean that the molecule chains contain only short branched chains, but no long branched chains and crosslinked structure. The "linear" characteristics of the polyethylene are resulted from the polymerized monomers and polymerization process conditions, and this is well known by a person skilled in the art. There is no specific limitation to the content of the α-olefin comonomer of component A, component B and component C. In some embodiments, the molar contents of the α-olefin comonomer in component A, component B and component C may each independently range from 0.2 mol % to 15 mol %, such as from 1.5 mol % to 10 mol %.

In an embodiment of this aspect where the polyethylene composition comprises the aforesaid component A, component B, and component C, the amount of component A, $W_A$, ranges from 25 to 90 parts by weight, the amount of component B, $W_B$, ranges from 0.1 to 10 parts by weight, and the amount of component C, $W_C$, ranges from 10 to 75 parts by weight. In some embodiments, the amount of component A, $W_A$, ranges from 30 to 80 parts by weight, the amount of component B, $W_B$, ranges from 0.5 to 8 parts by weight, and the amount of component C, $W_C$, ranges from 20 to 70 parts by weight. By having the amounts of components A, B and C in the above-mentioned ranges, the resultant polyethylene composition may have good film forming performance and, at the same time, good mechanical properties and optical properties. Further, in some embodiments, the amount of component A, $W_A$, the amount of component C, $W_C$, and the melt index of component A, $MI_A$, satisfy: $4.6 \times lgMI_A + 10.4 \geq W_A/W_C \geq 0.18 \times lgMI_A + 0.7$, such as: $1.8 \times lgMI_A \pm 4.7 \geq W_A/W_C \geq 0.22 \times lgMI_A + 0.9$. The polyethylene composition disclosed herein may have a large stretch ratio and a high stretching speed when it is processed through a flat-film biaxially stretching method.

In an embodiment of this aspect where the polyethylene composition comprises the aforesaid component A, component B, and component C, the polyethylene composition has a melt index of from 0.1 to 20 g/10 min, such as from 0.5 to 10 g/10 min. By having the melt index of the polyethylene composition as a whole within the aforesaid ranges, the polyethylene composition may have simultaneously excellent film forming performance, high tensile strength, high puncture strength, and low haze.

In this aspect of the present disclosure, there is no specific limitation to the content of component B. In some embodiments, the content of component B, $M_B$, may be no more than 35 wt %, such as no more than 25 wt %, based on the total weight of the polyethylene composition.

In an embodiment, the components A, B, and C have, each independently, a molecular weight distribution index $M_w/M_n$ of no more than 8.0, such as in a range of from 3.5 to 6.0. The components A, B and C having the aforesaid molecular weight distribution indexes each may be produced by polymerization using a Ziegler-Natta catalyst. The Ziegler-Natta catalyst may be any of those commonly used in the art, and it may comprise a magnesium and titanium-based component, an organic aluminum compound and optionally an electron donor, as well known by a person skilled in the art. It has been found that, by using in combination the components A, B, and C, such as those having the above-specified melt indexes and densities and prepared by the Ziegler-Natta catalyzed polymerization, the resultant ethylene composition may have good film forming performance, and the resultant film may have very high strength and therefore is suitable for packaging application.

In a third aspect, the present disclosure provides a polyethylene composition comprising an ethylene/α-olefin copolymerized linear low density polyethylene, wherein the polyethylene composition has a Mw of from 100,000 g/mol to 200,000 g/mol, such as from 100,000 g/mol to 160,000 g/mol, a Mw/Mn of from 4.5 to 8.5, a Mz/Mw of from 4.5 to 6.5, and a Mz+1/Mw of from 7.5 to 13.0.

In some embodiments, the polyethylene composition has such a temperature rising elution curve, obtained by analytical temperature rising elution fractionation (TREF) method, that includes a high-temperature eluting peak and a low-temperature eluting peak, wherein the high-temperature eluting peak may appear at a temperature ranging from 90 to 110° C., such as a temperature ranging from 95 to 100° C., and the low-temperature eluting peak may appear at a temperature ranging from 50 to 90° C., such as a temperature ranging from 60 to 90° C., and wherein the area of the high-temperature eluting peak accounts for no more than 70%, such as no more than 60%, or from 5% to 55%, of the total area of the high-temperature eluting peak and the low-temperature eluting peak, and the area of the low-temperature eluting peak accounts for at least 30%, such as at least 40%, or from 45% to 95%, of the total area of the high-temperature eluting peak and the low-temperature eluting peak. Such a polyethylene composition may have good film forming performance, and a film prepared from the polyethylene composition may have good mechanical properties and optical properties.

In some embodiments, the polyethylene composition has a melting temperature, measured by differential scanning calorimetry (DSC), in a range of from 100 to 130° C., such as from 110 to 130° C. Such a polyethylene composition may have good film forming performance, good casting processability, and high mechanical strengths.

In this aspect of the present disclosure, there is no specific limitation to the content of the α-olefin comonomer of the linear low density polyethylene. In some embodiments, the molar content of the α-olefin comonomer may range from 0.5 mol % to 20 mol %, such as from 2 mol % to 10 mol %. As used herein, the term "molar content of α-olefin comonomer" is intended to mean the percentage by mole of α-olefin-derived units, based on the total mole number of both ethylene-derived units and α-olefin-derived units.

In some embodiments of this aspect of the disclosure, the polyethylene composition comprises component A, component C, and optionally component B, wherein the component A comprises an ethylene/α-olefin copolymerized linear low density polyethylene having a melt index $MI_A$ of from 0.01 to 3.5 g/10 min and a density $\rho_A$ of from 0.880 to 0.936 g/cm$^3$; the component B comprises an ethylene/α-olefin copolymerized linear low density polyethylene having a melt index $MI_B$ of from 3.6 to 14.9 g/10 min and a density $\rho_B$ of from 0.910 to 0.930 g/cm$^3$; and the component C comprises an ethylene/α-olefin copolymerized linear low density polyethylene having a melt index $MI_C$ of from 15 to 150 g/10 min and a density $\rho_C$ of from 0.880 to 0.930 g/cm$^3$. Preferably, the component A has a melt index $MI_A$ of from 0.01 to 3 g/10 min, the component B has a melt index MID of from 4 to 10 g/10 min, and the component C has a melt index $MI_C$ of from 15 to 100 g/10 min. More preferably, the component A has a melt index $MI_A$ of from 0.01 to 2 g/10 min, the component B has a melt index $MI_B$ of from 4 to 5 g/10 min, and the component C has a melt index $MI_C$ of from 20 to 60 g/10 min.

In some embodiments, the component A has a density $\rho_A$ of from 0.910 to 0.930 g/cm$^3$, the component B has a density $\rho_A$ of from 0.913 to 0.928 g/cm$^3$, and the component C has a density $\rho_C$ of from 0.905 to 0.928 g/cm$^3$. In some embodiments, the component A has a density $\rho_A$ of from 0.915 to 0.926 g/cm$^3$, the component B has a density $\rho_B$ of from 0.913 to 0.924 g/cm$^3$, and the component C has a density $\rho_C$ of from 0.910 to 0.926 g/cm$^3$. In some embodiments, the respective densities $\rho_A$, $\rho_B$ and $\rho_C$ of component A, component B and component C of the polyethylene composition satisfy: $-0.045 \leq \rho_A - \rho_B \leq 0.02$ and $-0.045 \leq \rho_A - \rho_C \leq 0.02$. The resultant polyethylene composition may have not only good film forming performance but also very high tensile strength, very high puncture strength and low haze.

All of component A, component B, and component C may independently comprise an ethylene/α-olefin copolymerized linear low density polyethylene. As used herein, the term "linear" is intended to mean that the molecule chains contain only short branched chains, but no long branched chains and crosslinked structure. The "linear" characteristics of the polyethylene are resulted from the polymerized monomers and polymerization process conditions, and this is well known by a person skilled in the art. There is no specific limitation to the content of the α-olefin comonomer of component A, component B and component C. In some embodiments, the molar contents of the α-olefin comonomer in component A, component B and component C may each independently, in a range of from 0.2 mol % to 15 mol %, such as from 1.5 mol % to 10 mol %.

In an embodiment of this aspect where the polyethylene composition comprises the aforesaid component A, component B, and component C, the amount of component A, $W_A$, ranges from 25 to 90 parts by weight, the amount of component B, $W_B$, ranges from 0.1 to 10 parts by weight, and the amount of component C, $W_C$, ranges from 10 to 75 parts by weight. In some embodiments, the amount of component A, $W_A$, ranges from 30 to 80 parts by weight, the amount of component B, $W_B$, ranges from 0.5 to 8 parts by weight, and the amount of component C, $W_C$, ranges from 20 to 70 parts by weight. By having the amounts of components A, B and C in the above-mentioned ranges, the resultant polyethylene composition may have good film forming performance and, at the same time, good mechanical properties and optical properties. Further, in some embodiments, the amount of component A, $W_A$, the amount of component C, $W_C$, and the melt index of component A, $MI_A$, satisfy: $4.6 \times lgMI_A + 10.4 \geq W_A/W_C \geq 0.18 \times lgMI_A + 0.7$, such as: $1.8 \times lgMI_A + 4.7 \geq W_A/W_C \geq 0.22 \times lgMI_A + 0.9$. The polyethylene composition disclosed herein may have a large stretch ratio and a high stretching speed when it is processed through a flat-film biaxially stretching method.

In an embodiment of this aspect where the polyethylene composition comprises the aforesaid component A, component B, and component C, the polyethylene composition has a melt index of from 0.1 to 20 g/10 min, such as from 0.5 to 10 g/10 min. By having the melt index of the polyethylene composition as a whole within the aforesaid ranges, the polyethylene composition may have simultaneously excellent film forming performance, high tensile strength, high puncture strength, and low haze.

In this aspect of the present disclosure, there is no specific limitation to the content of component B. In some embodiments, the content of component B, $M_B$, may be no more than 35 wt %, such as no more than 25 wt %, based on the total weight of the polyethylene composition.

In an embodiment, the component A and component B have, each independently, a molecular weight distribution index $M_w/M_n$ of no more than 8.0, such as in a range of from 3.5 to 6.0, and component C has a molecular weight distribution index $M_w/M_n$ of no more than 4.5, such as in a range of from 2.0 to 4.2. Component A and component B having the aforesaid molecular weight distribution indexes may be produced by polymerization using a Ziegler-Natta catalyst, and component C having the aforesaid molecular weight distribution index may be produced by polymerization using a metallocene catalyst. The metallocene catalyst may be any of those commonly used in the art, and it may comprise a metallocene compound, an organic aluminum compound and optionally an electron donor, as well known by a person skilled in the art. The Ziegler-Natta catalyst may be any of those commonly used in the art, and it may comprise a magnesium and titanium-based component, an organic aluminum compound and optionally an electron donor, as well known by a person skilled in the art. It has been found that, by using in combination component A and component B, such as those having the above-specified melt indexes and densities and prepared by the Ziegler-Natta catalyzed polymerization, and component C, such as those having the above-specified melt index and density and prepared by the metallocene catalyzed polymerization, the resultant ethylene composition may have good film forming performance, and the resultant film may have very high strengths and puncturing resistance and therefore is suitable for packaging application.

In a fourth aspect, the present disclosure provides a polyethylene composition comprising an ethylene/α-olefin copolymerized linear low density polyethylene, wherein the polyethylene composition has a Mw of from 100,000 g/mol to 180,000 g/mol, such as from 100,000 g/mol to 150,000 g/mol, a Mw/Mn of from 4.0 to 8.0, a Mz/Mw of from 4.0 to 6.0, and a Mz+1/Mw of from 4.5 to 12.5.

In some embodiments, the polyethylene composition has such a temperature rising elution curve, obtained by analytical temperature rising elution fractionation (TREF) method, that includes a high-temperature eluting peak and a low-temperature eluting peak, wherein the high-temperature eluting peak may appear at a temperature ranging from 90 to 105° C., such as a temperature ranging from 95 to 100° C., and the low-temperature eluting peak may appear at a temperature ranging from 50 to 90° C., such as a temperature ranging from 60 to 90° C., and wherein the area of the high-temperature eluting peak accounts for no more than 60%, such as no more than 50%, or from 5 to 45%, of the total area of the high-temperature eluting peak and the low-temperature eluting peak, and the area of the low-temperature eluting peak accounts for at least 40%, such as at least 50%, or from 55 to 95%, of the total area of the high-temperature eluting peak and the low-temperature eluting peak. Such a polyethylene composition may have good film forming performance, and a film prepared from the polyethylene composition may have good mechanical properties and optical properties.

In some embodiments, the polyethylene composition has a melting temperature, measured by differential scanning calorimetry (DSC), in a range of from 100 to 130° C., such as from 105 to 128° C. Such a polyethylene composition may have good film forming performance, good casting processability, and high mechanical strengths.

In this aspect of the present disclosure, there is no specific limitation to the content of the α-olefin comonomer of the linear low density polyethylene. In some embodiments, the molar content of the α-olefin comonomer may range from 0.5 mol % to 20 mol %, such as from 2 mol % to 10 mol %.

In some embodiments of this aspect of the disclosure, the polyethylene composition comprises component A, component C, and optionally component B, wherein the component A comprises an ethylene/α-olefin copolymerized linear low density polyethylene having a melt index $MI_A$ of from 0.01 to 2 g/10 min and a density $\rho_A$ of from 0.880 to 0.936 g/cm$^3$; the component B comprises an ethylene/α-olefin copolymerized linear low density polyethylene having a melt index $MI_B$ of from 2.1 to 14.9 g/10 min and a density $\rho_B$ of from 0.910 to 0.930 g/cm$^3$; and the component C comprises an ethylene/α-olefin copolymerized linear low density polyethylene having a melt index $MI_C$ of from 15 to 150 g/10 min and a density $\rho_C$ of from 0.880 to 0.930 g/cm$^3$.

In some embodiments, the component A has a melt index $MI_A$ of from 0.01 to 1.5 g/10 min, the component B has a melt index $MI_B$ of from 3 to 10 g/10 min, and the component C has a melt index $MI_C$ of from 15 to 100 g/10 min. In some embodiments, the component A has a melt index $MI_A$ of from 0.01 to 1 g/10 min, the component B has a melt index $MI_B$ of from 3 to 5 g/10 min, and the component C has a melt index $MI_C$ of from 20 to 60 g/10 min.

In some embodiments, the component A has a density $\rho_A$ of from 0.910 to 0.930 g/cm$^3$, the component B has a density $\rho_B$ of from 0.913 to 0.928 g/cm$^3$, and the component C has a density $\rho_C$ of from 0.905 to 0.928 g/cm$^3$. In some embodiments, the component A has a density $\rho_A$ of from 0.915 to 0.926 g/cm$^3$, the component B has a density $\rho_B$ of from 0.913 to 0.924 g/cm$^3$, and the component C has a density $\rho_C$ of from 0.910 to 0.926 g/cm$^3$. In some embodiments, the respective densities $\rho_A$, $\rho_B$ and $\rho_C$ of component A, component B and component C of the polyethylene composition satisfy: $-0.045 \leq \rho_A - \rho_B \leq 0.02$ and $-0.045 \leq \rho_A - \rho_C \leq 0.02$. The resultant polyethylene composition may have not only good film forming performance but also very high tensile strength, very high puncture strength and low haze.

All of component A, component B, and component C may independently comprise an ethylene/α-olefin copolymerized linear low density polyethylene. As used herein, the term "linear" is intended to mean that the molecule chains contain only short branched chains, but no long branched chains and crosslinked structure. The "linear" characteristics of the polyethylene are resulted from the polymerized monomers and polymerization process conditions, and this is well known by a person skilled in the art. There is no specific limitation to the content of the α-olefin comonomer of component A, component B and component C. In some embodiments, the molar contents of the α-olefin comonomer in component A, component B and component C may each independently, range from 0.2 mol % to 15 mol %, such as from 1.5 mol % to 10 mol %.

In an embodiment of this aspect where the polyethylene composition comprises the aforesaid component A, component B, and component C, the amount of component A, $W_A$, ranges from 25 to 90 parts by weight, the amount of component B, $W_B$, ranges from 0.1 to 10 parts by weight, and the amount of component C, $W_C$, ranges from 10 to 75 parts by weight. In some embodiments, the amount of component A, $W_A$, ranges from 30 to 80 parts by weight, the amount of component B, $W_B$, ranges from 0.5 to 8 parts by weight, and the amount of component C, $W_C$, ranges from 20 to 70 parts by weight. By having the amounts of components A, B and C in the above-mentioned ranges, the resultant polyethylene composition may have good film forming performance and, at the same time, good mechanical properties and optical properties. Further, in some embodiments, the amount of component A, $W_A$, the amount of component C, $W_C$, and the melt index of component A, $MI_A$, satisfy: $5.2 \times \lg MI_A + 11.6 \geq W_A/W_C \geq 0.9 \times \lg MI_A + 2.1$, such as: $2.9 \times \lg MI_A + 6.8 \geq W_A/W_C \geq 1.1 \times \lg MI_A + 2.7$. The polyethylene composition disclosed herein may have a large stretch ratio and a high stretching speed when it is processed through a flat-film biaxially stretching method.

In an embodiment of this aspect where the polyethylene composition comprises the aforesaid component A, component B, and component C, the polyethylene composition has a melt index of from 0.1 to 20 g/10 min, such as from 0.5 to 10 g/10 min. By having the melt index of the polyethylene composition as a whole within the aforesaid ranges, the polyethylene composition may have simultaneously excellent film forming performance, high tensile strength, high puncture strength, and low haze.

In this aspect of the present disclosure, there is no specific limitation to the content of component B. In some embodiments, the content of component B, $M_B$, may be no more than 35 wt %, such as no more than 25 wt %, based on the total weight of the polyethylene composition.

In an embodiment of this aspect, component A, component B, and component C have, each independently, a molecular weight distribution index $M_w/M_n$ of no more than 4.5, such as in a range of from 2.0 to 4.2. Component A, component B and component C having the aforesaid molecular weight distribution indexes each may be produced by polymerization using a metallocene catalyst. The metallocene catalyst may be any of those commonly used in the art, and it may comprise a metallocene compound, an organic aluminum compound and optionally an electron donor, as well known by a person skilled in the art. It has been found that, by using in combination component A, component B, and component C, such as those having the above-specified melt indexes and densities and prepared by the metallocene catalyzed polymerization, the resultant ethylene composition may have good film forming performance, and the resultant film may have very high puncturing resistance and therefore is suitable for packaging application.

For any of the above aspects of the disclosure, the α-olefin mentioned in the description of the polyethylene compositions or any of the components A, B and C may be at least one chosen from $C_3$-$C_{20}$ olefins. In some embodiments, the α-olefin may be at least one chosen from propylene, 1-butylene, 2-butylene, 3-methyl-1-butylene, 4-methyl-1-butylene, 1-pentylene, 3-methyl-1-pentylene, 4-methyl-1-pentylene, 3,3-dimethyl-1-pentylene, 3,4-dimethyl-1-pentylene, 4,4-dimethyl-1-pentylene, 1-hexylene, 4-methyl-1-hexylene, 5-methyl-1-hexylene, 1-heptene, 2-heptene, 1-octene, 1-decene, 1-dodecene, 1-tetradecene, 1-hexadecene, 1-octadecene and 1-eicosen. In some embodiments, the α-olefin may be at least one chosen from 1-butylene, 1-hexylene and 1-octene.

In an embodiment of the disclosure, the polyethylene composition disclosed herein further comprises a lubricant to improve the extrusion processing performance of the polyethylene composition. Examples of the lubricant include, but are not limited to, polyethylene glycol (PEG) type lubricants, fluoropolymer type lubricants, siloxane type lubricants, fatty alcohol type lubricants, fatty acid type lubricants, ester of fatty acid type lubricants, stearamide type lubricants, fatty acid metal soap type lubricants, alkane and oxygenized alkane type lubricants, and nano-particle type lubricants. The PEG type lubricants may include, for example, PEGs having a molecular weight of from 500 to 50000, which may have been subjected to end capping, grafting, crosslinking, or other chemical or physical modifying. The fluoropolymer type lubricants may include, for example, polytetrafuloroethylene, poly(vinylidene fluoride), polyhexafluoro propylene, or other mono-modal or multi-modal, crystalline or semi-crystalline fluoropolymers. The fatty alcohol type lubricants may include, for example, palmityl alcohol, stearyl alcohol, or tallow fatty alcohol. The fatty acid type lubricants may include, for example, stearic acid, or 12-hydroxy stearic acid. The ester of fatty acid type lubricants may include, for example, butyl stearate, glycerin monostearate, palmityl palmitate, or stearyl stearate. The stearamide type lubricants may include, for example, stearylamide, oleylamide, erucicamide, or n,n-ethylenebisstearamide (EBS). The fatty acid metal soap type lubricants may include, for example, lead stearate, calcium stearate, magnesium stearate, or synthetic calcium acetate. The alkane and oxygenized alkane type lubricants may include, for example, liquid petrolatums, hard paraffins, polyethylene waxes, polypropylene waxes, or oxyethylene waxes. The nanoparticle type lubricants may include, for example, powdery rubbers, or particulate silica gels. The lubricant may be included in an amount commonly used in the art. For example, the lubricant may be included in an amount of from 0.05 to 5 parts by weight, such as from 0.5 to 3 parts by weight, per 100 parts by weight of all polyethylene resins in the composition.

The polyethylene composition may also comprise other additives commonly used in various polyethylene resins or polyethylene films in the art, provided that such additives will not adversely influence the stretching film formation performance, mechanic properties and optical properties of the polyethylene compositions disclosed herein. Such additives may include, but are not limited to, antioxidants, slip agents, antistatic agents, or anti-blocking agents. If used, such additives may be used in a conventional amount.

The polyethylene compositions disclosed herein may be prepared by any suitable method known in the art. For example, when comprising the components A, B and C, the polyethylene composition disclosed herein may be prepared by a method comprising the steps of: providing the component A, component B and component C (by separately preparing via polymerization the component A, component B and component C, for example); mixing the component A, component B, component C, optionally a lubricant, and optionally other additives according to desired proportions in a mixer; and then melt blending the resultant mixture in a melt blending equipment. The mixer may include, for example, a high-speed agitator or a kneader. The melt blending equipment may include, for example, a double screw extruder, a single screw extruder, a mill, or an internal mixer.

In an embodiment of the disclosure, the polyethylene composition is prepared in a multi-reactor parallel connection equipment as shown in FIG. 1. The multi-reactor parallel connection equipment comprises a first reactor 1, a second reactor 2, a third reactor 3, solid/liquid (vapor) separators 4, a homogenizing feed bin 5, and a melting and pelleting system 6. The first reactor 1, the second reactor 2 and the third reactor 3 are parallel connected. Three solid/liquid (vapor) separators 4 are provided to communicate with the first reactor 1, the second reactor 2 and the third reactor 3, respectively. Component A is polymerized in the first reactor 1, component B is polymerized in the second reactor 2, and component C is polymerized in the third reactor 3. The effluents from said reactors are separately subjected to separation in the relevant solid/liquid (vapor) separator 4, and the separated, component A, component B and component C are then delivered to the homogenizing feed bin 5, where they are mixed with the optional additives. The resultant mixture is then delivered to the melting and pelleting system 6, where it is extruded and pelleted. The polymerizations in the individual reactors may include batch polymerization or continuous polymerization. When such a multi-reactor system is used, the outputs of the corresponding reactors include the $W_A$, $W_B$ and $W_C$ mentioned above.

In a fifth aspect, the disclosure provides a film comprising at least one polyethylene layer formed from the above-disclosed polyethylene composition.

The film may have a mono-layer structure or a multi-layer structure. If the film has a multi-layer structure, at least a main layer (in general, the layer having the largest thickness) is formed from the polyethylene composition disclosed herein. For example, the film may have a complex structure comprising an upper skin layer, a core layer and a lower skin layer, and at least the core layer is formed from the polyethylene composition disclosed herein. In some embodiments, the thickness of the film may range from 10 to 200 μm, such as from 10 to 100 μm. In some embodiments, when the film has a complex structure comprising the upper skin layer, the core layer and the lower skin layer, the thicknesses of the upper skin layer and the lower skin layer account, each independently, for 1 to 25% of the total thickness of the film.

In some embodiments, the film may be a monoaxially oriented film or a biaxially oriented film, such as a biaxially oriented film, or a biaxially oriented film prepared by a flat-film biaxially stretching method.

The process of making a biaxially oriented film through a flat-film biaxially stretching method is well known by a person skilled in the art. For example, the above-disclosed polyethylene composition is first added into a casting equipment to produce a cast sheet by extruding and casting, and the resultant cast sheet is then stretched in a film biaxially stretching equipment. In the production of the cast sheet, the die for extruding the polyethylene composition may be selected according to the desired film structure. For example, when a film having a mono-layer structure is to be produced, a mono-layer die may be used, and when a film having a multi-layer structure (for example, a film having a three-layer structure comprising an upper skin layer, a core layer and a lower skin layer) is to be produced, a multi-layer complex die may be used. In the latter case, at least one layer including the core layer of the multi-layer complex die may be communicated with a hopper accommodating the polyethylene composition disclosed herein so that at least one layer including the core layer of the resultant film comprises a polyethylene layer formed of the polyethylene composition disclosed herein. In the extruding and casting, extrusion temperature may range from 160 to 260° C., and the temperature of casting quenching roll may range from 15 to 85° C. In addition, the biaxially stretching operation may be carried out by a simultaneously stretching method (i.e., the machine direction (MD) stretching and transverse direction (TD) stretching of the film are carried out simultaneously) or by a sequentially stretching method (i.e., the MD stretching of the film is carried out first, and the TD stretching of the film is then carried out). In an embodiment, the simultaneously stretching may be carried out as follows: after the cast sheet has been sufficiently preheated, the cast sheet is stretched simultaneously on MD and TD, wherein the temperature for preheating may range from 75 to 165° C., the temperature for stretching may range from 75 to 160° C., MD stretch ratio is at least 4, TD stretch ratio is at least 5, and TD stretching speed is at least 50%/s. In an embodiment, the sequentially stretching may be carried out as follows: after the cast sheet has been sufficiently preheated, the cast sheet is stretched first on MD, and then on TD, wherein the temperature for preheating may range from 65 to 158° C., the temperature for stretching may range from 65 to 155° C., MD stretch ratio is at least 4, TD stretch ratio is at least 5, and TD stretching speed is at least 50%/s. In some embodiments, upon the completion of the stretching, the film may be subjected to no finishing treatment or, alternatively, an annealing treatment. When the annealing treatment is carried out, the temperature for annealing the film may range from 80 to 165° C. The film may also be subjected to a surface corona treatment. Finally, the film may be cut edge and then taken-up, to afford the film disclosed herein.

The film disclosed herein may have good film forming performance, a large stretch ratio, and a high stretching speed. In the production of the biaxially oriented film through tenter frame processes, as indicated above, the film may have a MD stretch ratio of at least 4 and a TD stretch ratio of at least 5. The larger the stretch ratio, the higher the mechanical strengths of the film. In some embodiments, the film has a TD stretching speed of at least 50%/s, such as from 60 to 300%/s.

The biaxially oriented films disclosed herein may have high mechanical strengths and good optical properties. In an embodiment, the biaxially oriented films have a MD tensile strength of at least 55 MPa, such as at least 60 MPa; a TD tensile strength of at least 65 MPa, such as at least 70 MPa; and a puncture strength of at least 2.5N, such as at least 3.5N. In some embodiments, the biaxially oriented films have an elongation at break of no more than 350%, such as no more than 300%.

In the present disclosure, the MD tensile strength and the TD tensile strength are measured according to GB/T 1040.3-2006. In the present disclosure, the puncture strength is measured according to GB/T 10004-2008, with the thickness of the film sample being 25±2 μm. In the present disclosure, the elongation at break is measured according to GB/T 1040.3-2006.

The films disclosed herein may have advantages such as low production cost and simple production process, and promise to a wide range of applications.

EXAMPLES

The following examples are given for further illustrating the invention, but do not make limitations to the invention in any way.

In the following Examples and Comparative Examples:

Film biaxially stretching equipment used was Karo IV, available from Brückner Co. German.

Molecular weights and molecular weight distribution index ($M_w$, $M_w/M_n$, $M_z$, $M_{z+1}$): measured by using PL-GPC 220 Model Gel Permeation Chromatography provided with IR5 Model infrared detector (available from Polymer Laboratories Co., England). Three Plgel 10 μm MIXED-B columns in series were used, 1,2,4-trichlorobenzene was used as solvent and mobile phase, column temperature was 150° C., flow rate was 1.0 mL/min, and EasiCal PS-1 narrow distributed polystyrene standards available from Polymer Laboratories Co. were used to calibrate the system.

Analytical temperature rising elution fractionation (A-TREF): performed by using TREF 300 Model temperature rising elution fractionation instrument manufactured by Polymer Char S.A., Spain. Specifically, 80 mg of a polyethylene sample was combined with 40 mL of 1,2,4-trichlorobenzene containing 0.03 wt % of Anti-oxidant BHT. The resultant mixture was stirred at 160° C. and 200 rpm under nitrogen atmosphere for 60 min to afford a solution. Then, an aliquot (2 mL) was added to the analytical column. The analytical column was cooled at a rate of 40° C./min to 95° C., maintained at 95° C. for 45 min, then cooled at a rate of 0.1° C./min to 35° C., and maintained at 35° C. for 30 min. Next, the temperature of the column was raised at a rate of 1.0° C./min, meanwhile the column was eluted with eluant, 1,2,4-trichlorobenzene, at a flow rate of 0.5 mL/min. The elute was measured with an infrared detector for its concentration, thereby obtaining the concentrations of the sample dissolved at different temperatures, which were normalized to afford a temperature rising elution curve.

Melting temperature: measured under nitrogen atmosphere by using Perkin-Elmer DSC-7 differential scanning calorimeter, which had been calibrated for temperature and heat flow with Indium. Specifically, 5 mg of a sample was heated at a rate of 10° C./min to 180° C. and maintained at that temperature for 5 min to eliminate its heat history. Then, the sample was cooled at a rate of 10° C./min to 0° C., maintained at 0° C. for 1min, and then heated at a rate of 10° C./min to 180° C. The melting temperature was read from the heat flow curve of the second heating.

Content of α-olefin-derived units: measured through $^{13}C$ nuclear magnetic resonance spectroscopy by using BRUKER AVANCE III 400 Hz nuclear magnetic resonance spectrometer, using a 10 mm probe, a testing temperature of 125° C., 90 ms pulse, waltz16 decoupling, 5 s of acquiring time, and 10 s delay time. Sample preparation: a sample was dissolved at 130-140° C. in deuteraed o-dichlorobenzene at a concentration of 10% w/v.

Melt index (MI): measured according to the method specified in GB/T 3682-2000, at 190° C. under 2.16 kg load.

Density: measured according to the density gradient column method specified in GB/T 1033.2-2010.

Film haze: measured according to GB/T 2410-2008, with the thickness of the film sample being 25±2 μm.

Film tensile strength, modulus and elongation at break: measured according to GB/T 1040.3-2006.

Film puncture strength: measured according to GB/T10004-2008, with the thickness of the film sample being 25±2 μm.

Ethylene, α-olefin comonomers, hydrogen gas and nitrogen gas were of polymerization grade, and were dewatered and deoxygenated prior to use.

Example 1

(1) Preparation of Polyethylene Composition

This Example shows a polyethylene composition comprising component A, component B and component C.

Ethylene, α-olefin, hydrogen gas and nitrogen gas were charged into a fluidized bed gas phase reactor, and a supported-type metallocene catalyst system (which was prepared according to Example 1 of CN102453124A) was then introduced thereto. Then, polymerizations were performed at a temperature of 84 to 88° C. under a pressure of 1.8 to 2.0 MPa to afford component A, component B and component C, respectively. During the polymerizations, the amount of the hydrogen gas added was adjusted to control the melt index of the resulting polymers, and the kind of the α-olefin as a comonomer and the amount thereof were altered to control the density of the resulting polymers.

Component A: an ethylene-1-hexylene copolymerized linear low density polyethylene, having a $MI_A$ of 1.5 g/10 min, a density $\rho_A$ of 0.913 g/cm$^3$, a $M_w/M_n$ of 3.4, and a molar content of the 1-hexylene of 7.5 mol %.

Component B: an ethylene-1-hexylene copolymerized linear low density polyethylene, having a $MI_B$ of 2.1 g/10 min, a density $\rho_B$ of 0.913 g/cm$^3$, a $M_w/M_n$ of 3.2, and a molar content of the 1-hexylene of 7.5 mol %.

Component C: an ethylene-1-butylene copolymerized linear low density polyethylene, having a $MI_C$ of 15 g/10 min, a density $\rho_C$ of 0.905 g/cm$^3$, a $M_w/M_n$ of 3.5, and a molar content of the 1-butylene of 9.1 mol %.

80 parts by weight of the component A, 10 parts by weight of the component B, and 20 parts by weight of the component C were mixed, and then 0.11 parts by weight of polyethylene glycol (PEG) lubricant (available from Clariant Co., Switzerland, having a molecular weight of 10,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 160° C. and 210° C. The feedstock was melted, uniformly mixed, extruded, pelleted, and dried, to afford pellets of a polyethylene composition. The polyethylene composition was found to have a MI of 2.4 g/10 min.

(2) Preparation of Polyethylene Film

The pellets of the polyethylene composition prepared in step (1) were dried, added into the core layer extruder, upper skin layer extruder and lower skin layer extruder of LCR400 multi-layer extrusion casting machine (manufactured by Labtech Co., Sweden), and then melt extruded and casted to afford a cast sheet comprising an upper skin layer, a core layer and a lower skin layer, with the temperature of casting quenching roll being set at 25° C., and the upper and lower skin layer extruders being also charged with silica as an anti-blocking agent in an amount of 2 wt %, based on the weight of the polyethylene composition pellets added to the corresponding extruders.

The above-prepared polyethylene cast sheet was placed in the clamp of the film biaxially stretching equipment, and was subjected to MD stretching at first and then TD stretching, with the process conditions being as follows: MD preheating temperature was 100° C., MD stretching temperature was 110° C., MD stretch ratio was 4; TD preheating temperature was 100° C., TD stretching temperature was 115° C., TD stretch ratio was 5, film TD stretching speed was 60%/s; film setting temperature was 120° C. A film comprising an upper skin layer, a core layer and a lower skin layer and having a total thickness of 25 μm, an upper skin layer thickness of 0.5 μm and a lower skin layer thickness of 0.5 μm was obtained. Each layer of the film contains the polyethylene composition of this Example, and the upper skin layer and the lower skin layer further contain 2 wt % of silica as anti-blocking agent.

Example 2

(1) Preparation of Polyethylene Composition

This Example shows a polyethylene composition comprising component A, component B and component C.

Ethylene, α-olefin, hydrogen gas and nitrogen gas were charged into a fluidized bed gas phase reactor, and a supported-type metallocene catalyst system (which was prepared according to Example 1 of CN102453124A) was then introduced thereto. Then, polymerizations were performed at a temperature of 84 to 88° C. under a pressure of 1.8 to 2.0 MPa to afford component A, component B and component C, respectively. During the polymerizations, the amount of the hydrogen gas added was adjusted to control the melt index of the resulting polymers, and the kind of the α-olefin as a comonomer and the amount thereof were altered to control the density of the resulting polymers.

Component A: an ethylene-1-butylene copolymerized LLDPE, having a $MI_A$ of 0.01 g/10 min, a density $\rho_A$ of 0.930 g/cm$^3$, a $M_w/M_n$ of 3.0, and a molar content of 1-butylene of 1.6 mol %.

Component B: an ethylene-1-butylene copolymerized LLDPE, having a $MI_B$ of 10.0 g/10 min, a density $\rho_B$ of 0.930 g/cm$^3$, a $M_w/M_n$ of 2.8, and a molar content of 1-butylene of 1.9 mol %.

Component C: an ethylene-1-hexylene copolymerized LLDPE, having a $MI_C$ of 60 g/10 min, a density $\rho_C$ of 0.922 g/cm$^3$, a $M_w/M_n$ of 2.9, and a molar content of 1-hexylene of 3.8 mol %.

55 parts by weight of component A, 5 parts by weight of component B, and 55 parts by weight component C were mixed, and then 3.5 parts by weight of PEG lubricant (available from Clariant Co., Switzerland, having a molecular weight of 6,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 180° C. and 240° C. The feedstock was melted, uniformly mixed, extruded, pelleted, and dried, to afford pellets of a polyethylene composition. The polyethylene composition was found to have a MI of 0.9 g/10 min.

(2) Preparation of Polyethylene Film

The pellets of the polyethylene composition prepared in step (1) were dried, added into the core layer extruder, upper skin layer extruder and lower skin layer extruder of LCR400 multi-layer extrusion casting machine (manufactured by Labtech Co., Sweden), and then melt extruded and casted to afford a cast sheet comprising an upper skin layer, a core layer and a lower skin layer, with the temperature of casting quenching roll being set at 85° C., and the upper and lower skin layer extruders being also charged with silica as an anti-blocking agent in an amount of 2 wt %, based on the weight of the polyethylene composition pellets added to the corresponding extruders.

The above-prepared polyethylene cast sheet was placed in the clamp of the film biaxially stretching equipment, and was subjected to MD stretching at first and then TD stretching, with the process conditions being as follows: MD preheating temperature was 130° C., MD stretching temperature was 126° C., MD stretch ratio was 4; TD preheating temperature was 130° C., TD stretching temperature was 128° C., TD stretch ratio was 6, film TD stretching speed was 100%/s; film setting temperature was 130° C. A film comprising an upper skin layer, a core layer and a lower skin layer and having a total thickness of 25 µm, an upper skin layer thickness of 1 µm and a lower skin layer thickness of 1 µm was obtained. Each layer of the film contains the polyethylene composition of this Example, and the upper skin layer and the lower skin layer further contain 2 wt % of silica as anti-blocking agent.

Example 3

(1) Preparation of Polyethylene Composition

This Example shows a polyethylene composition obtained via polymerizations in a multi-reactor parallel connection equipment as shown in FIG. 1, wherein component A was polymerized in a first reactor 1, component B was polymerized in a second reactor 2, and component C was polymerized in a third reactor 3.

N-hexane, α-olefin, and hydrogen gas were charged into the three polymerization reactors, and the polymerization reactors were heated to predetermined polymerization temperatures. Then, ethylene monomer and a supported-type metallocene catalyst system (which was prepared according to Example 1 of CN102453124A) were introduced simultaneously thereto. Polymerizations were performed at a temperature of 140° C. under a pressure of 2.5 MPa for min to afford component A, component B and component C, respectively. During the polymerizations, the amount of the hydrogen gas added was adjusted to control the melt index of the resulting polymer, and the kind of the α-olefin as a comonomer and the amount thereof were altered to control the density of the resulting polymer.

In the preparation, the weight ratio of the output of component A from the first reactor 1 over unit time, $W_A$, to the output of component B from the second reactor 2 over unit time, $W_B$, to the output of component C from the first reactor 3 over unit time, $W_C$, ($W_A:W_B:W_C$) was 75:2:35.

Component A: an ethylene-1-octene copolymerized LLDPE having a $MI_A$ of 0.1 g/10 min, a density $\rho_A$ of 0.920 g/cm$^3$, a $M_w/M_n$ of 3.1, and a molar content of 1-octene of 2.1 mol %.

Component B: an ethylene-1-butylene copolymerized LLDPE having a $MI_B$ of 5.0 g/10 min, a density $\rho_A$ of 0.920 g/cm$^3$, a $M_w/M_n$ of 3.5, and a molar content of 1-butylene of 5.1 mol %.

Component C: an ethylene-1-butylene copolymerized LLDPE having a $MI_C$ of 25 g/10 min, a density $\rho_C$ of 0.920 g/cm$^3$, a $M_w/M_n$ of 3.2, and a molar content of 1-butylene of 5.1 mol %.

The effluents from said reactors were separately transferred to the corresponding solid/liquid (vapor) separator 4, where phase separation was carried out, and the separated components A, B, and C were delivered to the homogenizing feed bin 5 provided with an agitator. A polyethylene wax as a lubricant (available from Honeywell Co., America) was also added to the homogenizing feed bin 5 in an amount of 1 part by weight per 100 parts by weight of the combination of the components A, B and C. The homogenized mixture from the homogenizing feed bin 5 was added into the hopper of a double screw extruder manufactured by W&P Co., and then was melt mixed, extruded, pelleted, and dried, to afford pellets of polyethylene composition. In the extruder, the barrel temperatures were maintained between 170 and 230° C. The pellets were found to have a MI of 0.6 g/10 min.

(2) Preparation of Polyethylene Film

The pellets of the polyethylene composition prepared in step (1) were dried, added into LCR400 multi-layer extrusion casting machine (manufactured by Labtech Co., Sweden), and then melt extruded and casted to afford a cast sheet of mono-layer structure, with the temperature of casting quenching roll being set at 35° C.

The above-prepared polyethylene cast sheet was placed in the clamp of the film biaxially stretching equipment, and was subjected to MD stretching at first and then TD stretching, with the process conditions being as follows: MD preheating temperature was 116° C., MD stretching temperature was 118° C., MD stretch ratio was 4; TD preheating temperature was 120° C., TD stretching temperature was 120° C., TD stretch ratio was 5, film TD stretching speed was 100/o/s; film setting temperature was 122° C. A monolayer film having an average thickness of 25 µm was obtained.

Example 4

A polyethylene composition and a polyethylene film were prepared by following the procedure described in Example 1, except that in the polyethylene composition, component B was replaced with the same parts by weight of component C. That is, the polyethylene composition comprised component A and component C, but not component B. A film having an average thickness of 25 m was obtained, with both the upper skin layer and the lower skin layer having a thickness of 0.5 µm.

Example 5

A polyethylene composition was prepared by following the procedure described in Example 1, except that the amounts of the individual raw materials used in the polymerization of component A were altered so that the resultant component A had a $MI_A$ of 1.5 g/10 min, a density $\rho_A$ of 0.928 g/cm$^3$, a $M_w/M_n$ of 3.0, and a molar content of 1-hexylene of 1.9 mol %.

A polyethylene film was prepared by following the procedure described in Example 1, except that the above-prepared polyethylene composition was used. The polyethylene film was found to have an average thickness of 25 μm, with both the upper skin layer and the lower skin layer having a thickness of 0.5 μm.

Comparative Example 1

(1) Polyethylene Raw Material

This Comparative Example selected a film grade linear low density polyethylene (Grade ELITE 5400G, available from DOW Chemical Co., America) as the polyethylene raw material. Said linear low density polyethylene was prepared by using a metallocene catalyst, had a MI of 1.0 g/10 min, a density of 0.916 g/cm$^3$, and a $M_w/M_n$ of 3.2.

(2) Preparation of Polyethylene Film

The procedure as described in Example 3 was followed to prepare a polyethylene film, except that the same parts by weight of the polyethylene raw material described above were used to replace for the polyethylene composition pellets as used in Example 3. Although many times of attempt had been made, film fracture phenomenon always occurred so that no film was obtained by stretching. In addition, even when the TD stretching speed was reduced to 50%/s, film fracture phenomenon still occurred so that no film was obtained by stretching.

Comparative Example 2

(1) Polyethylene Raw Material

This Comparative Example used the same polyethylene raw material as Comparative Example 1.

(2) Preparation of Polyethylene Film

An up-blowing film blowing equipment available from MR. COLLOIN Co, German was used to prepare the polyethylene film. Specifically, the polyethylene raw material selected in step (1) was added to the hopper of the extruder of the film blowing equipment, and after having been sufficiently melted and plasticized in the extruder, the raw material was extruded though an annular die to form a tubular melt film, which was blown-up with compressed air at a blowing ratio of 2.5 and cooled by a wine ring to form a polyethylene film. The film had an average thickness of 25 μm and a mono-layer structure.

Comparative Example 3

(1) Preparation of Polyethylene Composition

This Comparative Example shows a polyethylene composition comprising component 1 and component 2.

Ethylene, α-olefin, hydrogen gas and nitrogen gas were charged into a fluidized bed gas phase reactor, and a supported-type metallocene catalyst system (which was prepared according to Example 1 of CN102453124A) was then introduced thereto. Then, polymerizations were performed at a temperature of 84 to 88° C. under a pressure of 1.8 to 2.0 MPa for 60 min to afford component 1 and component 2, respectively. During the polymerizations, the amount of the hydrogen gas added was adjusted to control the melt index of the resulting polymers, and the kind of the α-olefin as a comonomer and the amount thereof were altered to control the density of the resulting polymers.

Component 1: an ethylene-1-hexylene copolymerized LLDPE, having a $MI_1$ of 5.0 g/10 min, a density $\rho_1$ of 0.913 g/cm$^3$, a $M_w/M_n$ of 3.2, and a molar content of 1-hexylene of 7.5 mol %.

Component 2: an ethylene-1-butylene copolymerized LLDPE, having a $MI_2$ of 15 g/10 min, a density $\rho_2$ of 0.905 g/cm$^3$, a $M_w/M_n$ of 3.5, and a molar content of 1-butylene of 9.8 mol %.

80 parts by weight of component 1 and 20 parts by weight of component 2 were mixed, and then 0.1 parts by weight of PEG lubricant (available from Clariant Co., Switzerland, having a molecular weight of 10,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 160° C. and 210° C. The feedstock was melted, uniformly mixed, extruded, pelleted, and dried, to afford pellets of a polyethylene composition. The polyethylene composition was found to have a MI of 6.2 g/10 min.

(2) Preparation of Polyethylene Film

A polyethylene film was prepared by following the procedure described in Example 1, except that the above-prepared polyethylene composition pellets were used. In many times of attempt, the largest stretch ratio was merely 2 (TD)×2 (MD), and the largest film TD stretch speed was merely 10%/s.

Comparative Example 4

(1) Preparation of Polyethylene Composition

This Comparative Example shows a polyethylene composition comprising component 1 and component 2.

Ethylene, α-olefin, hydrogen gas and nitrogen gas were charged into a fluidized bed gas phase reactor, and a supported-type metallocene catalyst system (which was prepared according to Example 1 of CN102453124A) was then introduced thereto. Then, polymerizations were performed at a temperature of 84 to 88° C. under a pressure of 1.8 to 2.0 MPa for 60 min to afford component 1 and component 2, respectively. During the polymerizations, the amount of the hydrogen gas added was adjusted to control the melt index of the resulting polymers, and the kind of the α-olefin as a comonomer and the amount thereof were altered to control the density of the resulting polymers.

Component 1: an ethylene-1-butylene copolymerized LLDPE, having a $MI_1$ of 0.01 g/10 min, a density $\rho_1$ of 0.930 g/cm$^3$, a $M_w/M_n$ of 2.8, and a molar content of 1-butylene of 1.8 mol %.

Component 2: an ethylene-1-hexylene copolymerized LLDPE, having a $MI_2$ of 5.0 g/10 min, a density $\rho_2$ of 0.922 g/cm$^3$, a $M_w/M_n$ of 2.7, and a molar content of 1-hexylene of 4.1 mol %.

55 parts by weight of component 1 and 55 parts by weight component 2 were mixed, and then 3.3 parts by weight of PEG lubricant (available from Clariant Co., Switzerland, having a molecular weight of 6,000) was added thereto. Then, the mixture was homogenized in a high-speed mixer, and the homogenized materials were added into the hopper of a double screw extruder produced by W&P Company.

The feedstock passed through the hopper and then entered into the barrel of the double screw extruder. During the proceeding, the temperatures of the barrel were maintained between 180° C. and 240° C. The feedstock was melted, uniformly mixed, extruded, pelleted, and dried, to afford pellets of a polyethylene composition. The polyethylene composition was found to have a MI of 0.22 g/10 min.

(2) Preparation of Polyethylene Film

A polyethylene film was prepared by following the procedure described in Example 2, except that the above-prepared polyethylene composition pellets were used. In many times of attempt, the largest stretch ratio was merely 2 (TD)×2 (MD), and the largest film TD stretch speed was merely 10%/s.

Comparative Example 5

(1) Preparation of Polyethylene Composition

This Comparative Example shows a polyethylene composition obtained via polymerizations in a multi-reactor parallel connection equipment, wherein component 1 was polymerized in a first reactor, and component 2 was polymerized in a second reactor.

N-hexane, α-olefin, and hydrogen gas were charged into the two polymerization reactors, and the polymerization reactors were heated to predetermined polymerization temperatures. Then, ethylene monomer and a supported-type metallocene catalyst system (which was prepared according to Example 1 of CN102453124A) were introduced simultaneously thereto. Polymerizations were performed at a temperature of 140° C. under a pressure of 2.5 MPa for 30 min to afford component 1 and component 2, respectively. During the polymerizations, the amount of the hydrogen gas added was adjusted to control the melt index of the resulting polymer, and the kind of the α-olefin as a comonomer and the amount thereof were altered to control the density of the resulting polymer.

In the preparation, the weight ratio of the output of component 1 from the first reactor over unit time, $W_1$, to the output of component 2 from the second reactor 2 over unit time, $W_2$, was 20:80.

Component 1: an ethylene-1-octene copolymerized LLDPE having a $MI_1$ of 0.1 g/10 min, a density $\rho_1$ of 0.920 g/cm$^3$, a $M_w/M_n$ of 3.1, and a molar content of 1-octene of 2.1 mol %.

Component 2: an ethylene-1-butylene copolymerized LLDPE having a $MI_2$ of 25 g/10 min, a density $\rho_2$ of 0.920 g/cm$^3$, a Mw/Mn of 3.5, and a molar content of 1-butylene of 5.1 mol %.

The effluents from said two reactors were separately transferred to corresponding solid/liquid (vapor) separators, where phase separation was carried out, and the separated components 1 and 2 were delivered to a homogenizing feed bin provided with an agitator. A polyethylene wax as a lubricant (available from Honeywell Co., America) was also added to the homogenizing feed bin in an amount of 1 part by weight per 100 parts by weight of the combination of the components 1 and 2. The homogenized mixture from the homogenizing feed bin was added into the hopper of a double screw extruder manufactured by W&P Co., and then was melt mixed, extruded, pelleted, and dried, to afford pellets of polyethylene composition. In the extruder, the barrel temperatures were maintained between 170 and 230° C. The pellets were found to have a MI of 8.2 g/10 min.

(2) Preparation of Polyethylene Film

A polyethylene film was prepared by following the procedure described in Example 3, except that the above-prepared polyethylene composition pellets were used. In many times of attempt, the largest stretch ratio was merely 2 (TD)×2 (MD), and the largest film TD stretch speed was merely 10%/s.

Example 6

(1) Preparation of Polyethylene Composition

This Example shows a polyethylene composition comprising component A, component B and component C.

Ethylene, α-olefin, hydrogen gas and nitrogen gas were charged into a fluidized bed gas phase reactor, and a Ziegler-Natta catalyst system (which was prepared according to Example 1 of CN101838351A) was then introduced thereto. Then, polymerizations were performed at a temperature of 84 to 88° C. under a pressure of 1.8 to 2.0 MPa to afford component A, component B and component C, respectively. During the polymerizations, the amount of the hydrogen gas added was adjusted to control the melt index of the resulting polymers, and the kind of the α-olefin as a comonomer and the amount thereof were altered to control the density of the resulting polymers.

Component A: an ethylene-1-hexylene copolymerized linear low density polyethylene, having a $MI_A$ of 2.0 g/10 min, a density $\rho_A$ of 0.913 g/cm$^3$, a $M_w/M_n$ of 6.4, and a molar content of the 1-hexylene of 8.9 mol %.

Component B: an ethylene-1-hexylene copolymerized linear low density polyethylene, having a $MI_B$ of 4.0 g/10 min, a density $\rho_A$ of 0.913 g/cm$^3$, a $M_w/M_n$ of 5.7, and a molar content of the 1-hexylene of 8.9 mol %.

Component C: an ethylene-1-butylene copolymerized linear low density polyethylene, having a $MI_C$ of 15 g/10 min, a density $\rho_C$ of 0.905 g/cm$^3$, a $M_w/M_n$ of 4.6, and a molar content of the 1-butylene of 10.1 mol %.

80 parts by weight of the component A, 10 parts by weight of the component B, and 20 parts by weight of the component C were mixed, and then 0.11 parts by weight of PEG lubricant (available from Clariant Co., Switzerland, having a molecular weight of 10,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 160° C. and 210° C. The feedstock was melted, uniformly mixed, extruded, pelleted, and dried, to afford pellets of a polyethylene composition. The polyethylene composition was found to have a MI of 3.4 g/10 min.

(2) Preparation of Polyethylene Film

The pellets of the polyethylene composition prepared in step (1) were dried, added into the core layer extruder, upper skin layer extruder and lower skin layer extruder of LCR400 multi-layer extrusion casting machine (manufactured by Labtech Co., Sweden), and then melt extruded and casted to afford a polyethylene cast sheet comprising an upper skin layer, a core layer and a lower skin layer, with the temperature of casting quenching roll being set at 25° C., and the upper and lower skin layer extruders being also charged with silica as an anti-blocking agent in an amount of 2 wt %, based on the weight of the polyethylene composition pellets added to the corresponding extruders.

The above-prepared polyethylene cast sheet was placed in the clamp of the film biaxially stretching equipment, and was subjected to MD stretching at first and then TD stretching, with the process conditions being as follows: MD preheating temperature was 100° C., MD stretching temperature was 110° C., MD stretch ratio was 4; TD preheating temperature was 100° C., TD stretching temperature was 115° C., TD stretch ratio was 5, film TD stretching speed was 150/ds; film setting temperature was 120° C. A film comprising an upper skin layer, a core layer and a lower skin layer and having a total thickness of 25 µm, an upper skin layer thickness of 0.5 µm and a lower skin layer thickness of 0.5 µm was obtained. Each layer of the film contains the polyethylene composition of this Example, and the upper skin layer and the lower skin layer further contain 2 wt % of silica as anti-blocking agent.

Example 7

(1) Preparation of Polyethylene Composition

This Example shows a polyethylene composition comprising component A, component B and component C.

Ethylene, α-olefin, hydrogen gas and nitrogen gas were charged into a fluidized bed gas phase reactor, and a Ziegler-Natta catalyst system (which was prepared according to Example 1 of CN101838351A) was then introduced thereto. Then, polymerizations were performed at a temperature of 84 to 88° C. under a pressure of 1.8 to 2.0 MPa to afford component A, component B and component C, respectively. During the polymerizations, the amount of the hydrogen gas added was adjusted to control the melt index of the resulting polymers, and the kind of the α-olefin as a comonomer and the amount thereof were altered to control the density of the resulting polymers.

Component A: an ethylene-1-butylene copolymerized LLDPE, having a $MI_A$ of 0.01 g/10 min, a density $\rho_A$ of 0.930 g/cm³, a $M_w/M_n$ of 5.5, and a molar content of 1-butylene of 2.1 mol %.

Component B: an ethylene-1-butylene copolymerized LLDPE, having a $MI_B$ of 9.0 g/10 min, a density $\rho_B$ of 0.930 g/cm³, a $M_w/M_n$ of 4.8, and a molar content of 1-butylene of 2.8 mol %.

Component C: an ethylene-1-hexylene copolymerized LLDPE, having a $MI_C$ of 40 g/10 min, a density $\rho_C$ of 0.922 g/cm³, a $M_w/M_n$ of 4.4, and a molar content of 1-hexylene of 4.0 mol %.

55 parts by weight of component A, 5 parts by weight of component B, and 55 parts by weight component C were mixed, and then 3.5 parts by weight of PEG lubricant (available from Clariant Co., Switzerland, having a molecular weight of 10,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 180° C. and 240° C. The feedstock was melted, uniformly mixed, extruded, pelleted, and dried, to afford pellets of a polyethylene composition. The polyethylene composition was found to have a MI of 0.7 g/10 min.

(2) Preparation of Polyethylene Film

A film comprising an upper skin layer, a core layer and a lower skin layer and having a total thickness of 25 µm, an upper skin layer thickness of 1 µm and a lower skin layer thickness of 1 µm was prepared from the above-prepared polyethylene composition pellets by following the procedure described in Example 2.

Example 8

(1) Preparation of Polyethylene Composition

This Example shows a polyethylene composition obtained via polymerizations in a multi-reactor parallel connection equipment as shown in FIG. 1, wherein component A was polymerized in a first reactor 1, component B was polymerized in a second reactor 2, and component C was polymerized in a third reactor 3.

N-hexane, α-olefin, and hydrogen gas were charged into the three polymerization reactors, and the polymerization reactors were heated to predetermined polymerization temperatures. Then, ethylene monomer and a Ziegler-Natta catalyst system (which was prepared according to Example 1 of CN101838351A) were introduced simultaneously thereto. Polymerizations were performed at a temperature of 240° C. under a pressure of 14.8 MPa for 60 min to afford component A, component B and component C, respectively. During the polymerizations, the amount of the hydrogen gas added was adjusted to control the melt index of the resulting polymer, and the kind of the α-olefin as a comonomer and the amount thereof were altered to control the density of the resulting polymer.

In the preparation, the weight ratio of the output of component A from the first reactor 1 over unit time, $W_A$, to the output of component B from the second reactor 2 over unit time, $W_B$, to the output of component C from the first reactor 3 over unit time, $W_C$, (i.e., $W_A:W_B:W_C$) was 75:2:35.

Component A: an ethylene-1-octene copolymerized LLDPE having a $MI_A$ of 0.1 g/0 min, a density $\rho_A$ of 0.920 g/cm³, a $M_w/M_n$ of 5.8, and a molar content of 1-octene of 2.5 mol %.

Component B: an ethylene-1-butylene copolymerized LLDPE having a $MI_B$ of 6.0 g/10 min, a density $\rho_B$ of 0.920 g/cm³, a $M_w/M_n$ of 4.5, and a molar content of 1-butylene of 5.3 mol %.

Component C: an ethylene-1-butylene copolymerized LLDPE having a $MI_C$ of 25 g/10 min, a density $\rho_C$ of 0.920 g/cm³, a $M_w/M_n$ of 4.2, and a molar content of 1-butylene of 5.7 mol %.

The effluents from said reactors were separately transferred to the corresponding solid/liquid (vapor) separator 4, where phase separation was carried out, and the separated components A, B, and C were delivered to the homogenizing feed bin 5 provided with an agitator. A polyethylene wax as a lubricant (available from Honeywell Co., America) was also added to the homogenizing feed bin 5 in an amount of 1 part by weight per 100 parts by weight of the combination of the components A, B and C. The homogenized mixture from the homogenizing feed bin 5 was added into the hopper of a double screw extruder manufactured by W&P Co., and then was melt mixed, extruded, pelleted, and dried, to afford pellets of polyethylene composition. In the extruder, the barrel temperatures were maintained between 170 and 230° C. The pellets were found to have a MI of 0.6 g/10 min.

(2) Preparation of Polyethylene Film

A mono-layer film having an average thickness of 25 μm was prepared from the above-prepared polyethylene composition pellets by following the procedure described in Example 3.

Example 9

A polyethylene composition and a polyethylene film were prepared by following the procedure described in Example 6, except that in the polyethylene composition, component B was replaced with the same parts by weight of component C. That is, the polyethylene composition comprised component A and component C, but not component B. A film having an average thickness of 25 m was obtained, with both the upper skin layer and the lower skin layer having a thickness of 0.5 μm.

Example 10

A polyethylene composition was prepared by following the procedure described in Example 6, except that the amounts of the individual raw materials used in the polymerization of component A were altered so that the resultant component A had a $MI_A$ of 2.0 g/10 min, a density $\rho_A$ of 0.928 g/cm$^3$, a $M_w/M_n$ of 5.1, and a molar content of 1-hexylene of 2.2 mol %.

A polyethylene film was prepared by following the procedure described in Example 6, except that the above-prepared polyethylene composition pellets were used. The polyethylene film was found to have an average thickness of 25 m, with both the upper skin layer and the lower skin layer having a thickness of 0.5 μm.

Comparative Example 6

(1) Polyethylene Raw Material

This Comparative Example selected a film grade linear low density polyethylene (Grade 7042, available from Yanshan Petrochemical Co. of SINOPEC, China) as the polyethylene raw material. Said linear low density polyethylene was prepared by using a Ziegler-Natta catalyst, had a MI of 2.0 g/10 min, a density of 0.920 g/cm$^3$, and a $M_w/M_n$ of 4.5.

(2) Preparation of Polyethylene Film

The procedure as described in Example 8 was followed to prepare a polyethylene film, except that the same parts by weight of the polyethylene raw material described above were used to replace for the polyethylene composition pellets as used in Example 8. Although many times of attempt had been made, film fracture phenomenon always occurred so that no film was obtained by stretching. In addition, even when the TD stretching speed was reduced to 50/ds, film fracture phenomenon still occurred so that no film was obtained by stretching.

Comparative Example 7

(1) Polyethylene Raw Material

This Comparative Example used the same polyethylene raw material as Comparative Example 6.

(2) Preparation of Polyethylene Film

An up-blowing film blowing equipment available from MR. COLLOIN Co, German was used to prepare the polyethylene film. Specifically, the polyethylene raw material selected in step (1) was added to the hopper of the extruder of the film blowing equipment, and after having been sufficiently melted and plasticized in the extruder, the raw material was extruded though an annular die to form a tubular melt film, which was blown-up with compressed air at a blowing ratio of 2.5 and cooled by a wine ring to form a polyethylene film. The film had an average thickness of 25 μm and a mono-layer structure.

Comparative Example 8

(1) Preparation of Polyethylene Composition

This Comparative Example shows a polyethylene composition comprising component 1 and component 2.

Ethylene, α-olefin, hydrogen gas and nitrogen gas were charged into a fluidized bed gas phase reactor, and a Ziegler-Natta catalyst system (which was prepared according to Example 1 of CN101838351A) was then introduced thereto. Then, polymerizations were performed at a temperature of 84 to 88° C. under a pressure of 1.8 to 2.0 MPa to afford component 1 and component 2, respectively. During the polymerizations, the amount of the hydrogen gas added was adjusted to control the melt index of the resulting polymers, and the kind of the α-olefin as a comonomer and the amount thereof were altered to control the density of the resulting polymers.

Component 1: an ethylene-1-hexylene copolymerized LLDPE, having a $MI_1$ of 5.0 g/10 min, a density $\rho_1$ of 0.913 g/cm$^3$, a $M_w/M_n$ of 6.4, and a molar content of 1-hexylene of 8.6 mol %.

Component 2: an ethylene-1-butylene copolymerized LLDPE, having a $MI_2$ of 15 g/10 min, a density $\rho_2$ of 0.905 g/cm$^3$, a $M_w/M_n$ of 5.5, and a molar content of 1-butylene of 10.8 mol %.

80 parts by weight of component 1 and 20 parts by weight of component 2 were mixed, and then 0.1 parts by weight of PEG lubricant (available from Clariant Co., Switzerland, having a molecular weight of 10,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 160° C. and 210° C. The feedstock was melted, uniformly mixed, extruded, pelleted, and dried, to afford pellets of a polyethylene composition. The polyethylene composition was found to have a MI of 6.2 g/10 min.

(2) Preparation of Polyethylene Film

A polyethylene film was prepared by following the procedure described in Example 6, except that the above-prepared polyethylene composition pellets were used. In many times of attempt, the largest stretch ratio was merely 2 (TD)×2 (MD), and the largest film TD stretch speed was merely 10%0/s.

Comparative Example 9

(1) Preparation of Polyethylene Composition

This Comparative Example shows a polyethylene composition comprising component 1 and component 2.

Ethylene, α-olefin, hydrogen gas and nitrogen gas were charged into a fluidized bed gas phase reactor, and a Ziegler-Natta catalyst system (which was prepared according to Example 1 of CN101838351A) was then introduced thereto. Then, polymerizations were performed at a temperature of 84 to 88° C. under a pressure of 1.8 to 2.0 MPa to afford component 1 and component 2, respectively. During the polymerizations, the amount of the hydrogen gas added was adjusted to control the melt index of the resulting polymers, and the kind of the α-olefin as a comonomer and the amount thereof were altered to control the density of the resulting polymers.

Component 1: an ethylene-1-butylene copolymerized LLDPE, having a $MI_1$ of 0.01 g/10 min, a density $\rho_1$ of 0.930 g/cm$^3$, a $M_w/M_n$ of 5.0, and a molar content of 1-butylene of 2.9 mol %.

Component 2: an ethylene-1-hexylene copolymerized LLDPE, having a $MI_2$ of 5.0 g/10 min, a density $\rho_2$ of 0.922 g/cm$^3$, a $M_w/M_n$ of 4.5, and a molar content of 1-hexylene of 4.9 mol %.

55 parts by weight of component 1 and 55 parts by weight component 2 were mixed, and then 3.3 parts by weight of PEG lubricant (available from Clariant Co., Switzerland, having a molecular weight of 10,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 180° C. and 240° C. The feedstock was melted, uniformly mixed, extruded, pelleted, and dried, to afford pellets of a polyethylene composition. The polyethylene composition was found to have a MI of 0.22 g/10 min.

(2) Preparation of Polyethylene Film

A polyethylene film was prepared by following the procedure described in Example 7, except that the above-prepared polyethylene composition pellets were used. In many times of attempt, the largest stretch ratio was merely 2 (TD)×2 (MD), and the largest film TD stretch speed was merely 10%/s.

Comparative Example 10

(1) Preparation of Polyethylene Composition

This Comparative Example shows a polyethylene composition obtained via polymerizations in a multi-reactor parallel connection equipment, wherein component 1 was polymerized in a first reactor, and component 2 was polymerized in a second reactor.

N-hexane, α-olefin, and hydrogen gas were charged into the two polymerization reactors, and the polymerization reactors were heated to predetermined polymerization temperatures. Then, ethylene monomer and a Ziegler-Natta catalyst system (which was prepared according to Example 1 of CN101838351A) were introduced simultaneously thereto. Polymerizations were performed at a temperature of 240° C. under a pressure of 14.8 MPa for 60 min to afford component 1 and component 2, respectively. During the polymerizations, the amount of the hydrogen gas added was adjusted to control the melt index of the resulting polymer, and the kind of the α-olefin as a comonomer and the amount thereof were altered to control the density of the resulting polymer.

In the preparation, the weight ratio of the output of component 1 from the first reactor over unit time, $W_1$, to the output of component 2 from the second reactor 2 over unit time, $W_2$, was 20:80.

Component 1: an ethylene-1-octene copolymerized LLDPE having a $MI_1$ of 0.1 g/10 min, a density $\rho_2$ of 0.920 g/cm$^3$, a $M_w/M_n$ of 5.8, and a molar content of 1-octene of 2.5 mol %.

Component 2: an ethylene-1-butylene copolymerized LLDPE having a $MI_2$ of 25 g/10 min, a density $\rho_2$ of 0.920 g/cm$^3$, a $M_w/M_n$ of 4.2, and a molar content of 1-butylene of 5.7 mol %.

The effluents from said two reactors were separately transferred to corresponding solid/liquid (vapor) separator, where phase separation was carried out, and the separated components 1 and 2 were delivered to a homogenizing feed bin provided with an agitator. A polyethylene wax as a lubricant (available from Honeywell Co., America) was also added to the homogenizing feed bin in an amount of 1 part by weight per 100 parts by weight of the combination of the components 1 and 2. The homogenized mixture from the homogenizing feed bin was added into the hopper of a double screw extruder manufactured by W&P Co., and then was melt mixed, extruded, pelleted, and dried, to afford pellets of polyethylene composition. In the extruder, the barrel temperatures were maintained between 170 and 230° C. The pellets were found to have a MI of 8.2 g/10 min.

(2) Preparation of Polyethylene Film

A polyethylene film was prepared by following the procedure described in Example 8, except that the above-prepared polyethylene composition pellets were used. In many times of attempt, the largest stretch ratio was merely 2 (TD)×2 (MD), and the largest film TD stretch speed was merely 10%/s.

Example 11

(1) Preparation of Polyethylene Composition

This Example shows a polyethylene composition comprising component A, component B and component C, wherein component A and component B were prepared by polymerizations using a supported-type metallocene catalyst (which was prepared according to Example 1 of CN102453124A), and component C was prepared by polymerization using a Ziegler-Natta catalyst (which was prepared according to Example 1 of CN101838351A).

Ethylene, α-olefin, hydrogen gas and nitrogen gas were charged into a fluidized bed gas phase reactor, and the metallocene catalyst system/Ziegler-Natta catalyst system was then introduced thereto. Then, polymerizations were performed at a temperature of 84 to 88° C. under a pressure of 1.8 to 2.0 MPa to afford component A, component B and component C, respectively. During the polymerizations, the amount of the hydrogen gas added was adjusted to control the melt index of the resulting polymers, and the kind of the α-olefin as a comonomer and the amount thereof were altered to control the density of the resulting polymers.

Component A: an ethylene-1-hexylene copolymerized LLDPE, having a $MI_A$ of 1.5 g/10 min, a density $\rho_A$ of 0.913 g/cm$^3$, a $M_w/M_n$ of 3.4, and a molar content of the 1-hexylene of 7.5 mol %.

Component B: an ethylene-1-hexylene copolymerized LLDPE, having a $MI_B$ of 2.1 g/10 min, a density $\rho_B$ of 0.913 g/cm$^3$, a $M_w/M_n$ of 3.2, and a molar content of the 1-hexylene of 7.5 mol %.

Component C: an ethylene-1-butylene copolymerized LLDPE, having a $MI_C$ of 15 g/10 min, a density $\rho_C$ of 0.905 g/cm$^3$, a $M_w/M_n$ of 4.6, and a molar content of the 1-butylene of 10.1 mol %.

80 parts by weight of the component A, 10 parts by weight of the component B, and 20 parts by weight of the component C were mixed, and then 0.11 parts by weight of a PEG lubricant (available from Clariant Co., Switzerland, having a molecular weight of 10,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 160° C. and 210° C. The feedstock was melted, uniformly mixed, extruded, pelleted, and dried, to afford pellets of a polyethylene composition. The polyethylene composition was found to have a MI of 2.4 g/10 min.

(2) Preparation of Polyethylene Film

A polyethylene film was prepared by following the procedure described in Example 1, except that the above-prepared polyethylene composition pellets were used. The polyethylene film was found to have an average thickness of 25 μm, with both the upper skin layer and the lower skin layer having a thickness of 0.5 μm.

Example 12

(1) Preparation of Polyethylene Composition

This Example shows a polyethylene composition comprising component A, component B and component C, wherein component A and component B were prepared by polymerizations using a supported-type metallocene catalyst (which was prepared according to Example 1 of CN102453124A), and component C was prepared by polymerization using a Ziegler-Natta catalyst (which was prepared according to Example 1 of CN101838351A).

Ethylene, α-olefin, hydrogen gas and nitrogen gas were charged into a fluidized bed gas phase reactor, and the metallocene/Ziegler Natta catalyst system was then introduced thereto. Then, polymerizations were performed at a temperature of 84 to 88° C. under a pressure of 1.8 to 2.0 MPa to afford component A, component B and component C, respectively. During the polymerizations, the amount of the hydrogen gas added was adjusted to control the melt index of the resulting polymers, and the kind of the α-olefin as a comonomer and the amount thereof were altered to control the density of the resulting polymers.

Component A: an ethylene-1-butylene copolymerized LLDPE, having a $MI_A$ of 0.01 g/10 min, a density $\rho_A$ of 0.930 g/cm$^3$, a $M_w/M_n$ of 3.0, and a molar content of 1-butylene of 1.6 mol %.

Component B: an ethylene-1-butylene copolymerized LLDPE, having a $MI_B$ of 9.0 g/10 min, a density $\rho_B$ of 0.930 g/cm$^3$, a $M_w/M_n$ of 2.8, and a molar content of 1-butylene of 1.9 mol %.

Component C: an ethylene-1-hexylene copolymerized LLDPE, having a $MI_C$ of 40 g/10 min, a density $\rho_C$ of 0.922 g/cm$^3$, a $M_w/M_n$ of 4.4, and a molar content of 1-hexylene of 4.0 mol %.

55 parts by weight of component A, 5 parts by weight of component B, and 55 parts by weight component C were mixed, and then 3.5 parts by weight of PEG lubricant (available from Clariant Co., Switzerland, having a molecular weight of 6,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 180° C. and 240° C. The feedstock was melted, uniformly mixed, extruded, pelleted, and dried, to afford pellets of a polyethylene composition. The polyethylene composition was found to have a MI of 0.7 g/10 min.

(2) Preparation of Polyethylene Film

A polyethylene film was prepared by following the procedure described in Example 2, except that the above-prepared polyethylene composition pellets were used. The polyethylene film was found to have an average thickness of 25 μm, with both the upper skin layer and the lower skin layer having a thickness of 1 μm.

Example 13

(1) Preparation of Polyethylene Composition

This Example shows a polyethylene composition obtained via polymerizations in a multi-reactor parallel connection equipment as shown in FIG. 1, wherein component A was polymerized by using a supported-type metallocene catalyst (which was prepared according to Example 1 of CN102453124A) in a first reactor 1, component B was polymerized by using the same metallocene catalyst in a second reactor 2, and component C was polymerized by using a Ziegler-Natta catalyst (which was prepared according to Example 1 of CN101838351A) in a third reactor 3.

N-hexane, α-olefin, and hydrogen gas were charged into the three polymerization reactors, and the polymerization reactors were heated to predetermined polymerization temperatures. Then, ethylene monomer and the metallocene/Ziegler-Natta catalyst system were introduced simultaneously thereto. Polymerizations in the rectors 1 and 2 were performed at a temperature of 140° C. under a pressure of 2.5 MPa for 30 min to afford component A and component B, and the polymerization in the reactor 3 was performed at a temperature of 240° C. under a pressure of 14.8 MPa for 60 min to afford component C. During the polymerizations, the amount of the hydrogen gas added was adjusted to control the melt index of the resulting polymer, and the kind of the α-olefin as a comonomer and the amount thereof were altered to control the density of the resulting polymer.

In the preparation, the weight ratio of the output of component A from the first reactor 1 over unit time, $W_A$, to the output of component B from the second reactor 2 over unit time, $W_B$, to the output of component C from the first reactor 3 over unit time, $W_C$, ($W_A:W_B:W_C$) was 75:2:35.

Component A: an ethylene-1-octene copolymerized LLDPE having a $MI_A$ of 0.1 g/10 min, a density $\rho_A$ of 0.920 g/cm$^3$, a $M_w/M_n$ of 3.1, and a molar content of 1-octene of 2.1 mol %.

Component B: an ethylene-1-butylene copolymerized LLDPE having a $MI_B$ of 5.0 g/10 min, a density $\rho_B$ of 0.920 g/cm$^3$, a $M_w/M_n$ of 3.5, and a molar content of 1-butylene of 5.1 mol %.

Component C: an ethylene-1-butylene copolymerized LLDPE having a $MI_C$ of 25 g/10 min, a density $\rho_C$ of 0.920 g/cm$^3$, a $M_w/M_n$ of 4.2, and a molar content of 1-butylene of 5.7 mol %.

The effluents from said reactors were separately transferred to the corresponding solid/liquid (vapor) separators 4, where phase separation was carried out, and the separated components A, B, and C were delivered to the homogenizing feed bin 5 provided with an agitator. A polyethylene wax as a lubricant (available from Honeywell Co., America) was also added to the homogenizing feed bin 5 in an amount of 1 part by weight per 100 parts by weight of the combination of the components A, B and C. The homogenized mixture from the homogenizing feed bin 5 was added into the hopper of a double screw extruder manufactured by W&P Co., and then was melt mixed, extruded, pelleted, and dried, to afford pellets of polyethylene composition.

In the extruder, the barrel temperatures were maintained between 170 and 230° C. The pellets were found to have a MI of 0.6 g/10 min.

(2) Preparation of Polyethylene Film

A mono-layer polyethylene film was prepared by following the procedure described in Example 3, except that the above-prepared polyethylene composition pellets were used. The polyethylene film was found to have an average thickness of 25 km.

Example 14

A polyethylene composition and a polyethylene film were prepared by following the procedure described in Example 11, except that in the polyethylene composition, component B was replaced with the same parts by weight of component C. That is, the polyethylene composition comprised component A and component C, but not component B. A film having an average thickness of 25 μm was obtained, with both the upper skin layer and the lower skin layer having a thickness of 0.5 μm.

Example 15

A polyethylene composition was prepared by following the procedure described in Example 11, except that the amounts of the individual raw materials used in the polymerization of component A were altered so that the resultant component A had a $MI_A$ of 1.5 g/10 min, a density $\rho_A$ of 0.928 g/cm$^3$, a $M_w/M_n$ of 3.0, and a molar content of I-hexylene of 1.9 mol %.

A polyethylene film was prepared by following the procedure described in Example 11, except that the above-prepared polyethylene composition was used. The polyethylene film was found to have an average thickness of 25 μm, with both the upper skin layer and the lower skin layer having a thickness of 0.5 μm.

Comparative Example 11

(1) Preparation of Polyethylene Composition

Pellets of a polyethylene composition were prepared by following the procedure described in step (1) of Comparative Example 3, except that in the polymerization for producing component 2, a Ziegler-Natta catalyst (which was prepared according to Example 1 of CN101838351A) was used to replace for the metallocene catalyst system. As a result, the obtained ethylene-1-butylene copolymerized LLDPE as component 2 was found to have a $MI_2$ of 15 g/10 min, a density $\rho_2$ of 0.905 g/cm$^3$, a $M_w/M_n$ of 5.5, and a molar content of 1-butylene of 10.8 mol %, and the obtained polyethylene composition was found to have a MI of 6.2 g/10 min.

(2) Preparation of Polyethylene Film

A polyethylene film was prepared by following the procedure described in Example 1, except that the above-prepared polyethylene composition pellets were used. In many times of attempt, the largest stretch ratio was merely 2 (TD)×2 (MD), and the largest film TD stretch speed was merely 10%/s.

Comparative Example 12

(1) Preparation of Polyethylene Composition

Pellets of a polyethylene composition were prepared by following the procedure described in step (1) of Comparative Example 4, except that in the polymerization for producing component 2, a Ziegler-Natta catalyst (which was prepared according to Example 1 of CN101838351A) was used to replace for the metallocene catalyst system. As a result, the obtained ethylene-1-hexylene copolymerized LLDPE as component 2 was found to have a $MI_2$ of 5.0 g/10 min, a density $\rho_2$ of 0.922 g/cm$^3$, a $M_w/M_n$ of 4.5, and a molar content of 1-hexylene of 4.9 mol %, and the obtained polyethylene composition was found to have a MI of 0.22 g/10 min.

(2) Preparation of Polyethylene Film

A polyethylene film was prepared by following the procedure described in Example 2, except that the above-prepared polyethylene composition pellets were used. In many times of attempt, the largest stretch ratio was merely 2 (TD)×2 (MD), and the largest film TD stretch speed was merely 10%/s.

Comparative Example 13

(1) Preparation of Polyethylene Composition

Pellets of a polyethylene composition were prepared by following the procedure described in step (1) of Comparative Example 5, except that the polymerization for producing component 2 used a Ziegler-Natta catalyst (which was prepared according to Example 1 of CN101838351A) to replace for the metallocene catalyst system, and was performed at a temperature of 240° C. under a pressure of 14.8 MPa for 60 min. As a result, the obtained ethylene-1-butylene copolymerized LLDPE as component 2 was found to have a $MI_2$ of 25 g/10 min, a density $\rho_2$ of 0.920 g/cm$^3$, a $M_w/M_n$ of 4.2, and a molar content of 1-butylene of 5.7 mol %, and the obtained polyethylene composition was found to have a MI of 8.2 g/10 min.

(2) Preparation of Polyethylene Film

A polyethylene film was prepared by following the procedure described in Example 3, except that the above-prepared polyethylene composition pellets were used. In many times of attempt, the largest stretch ratio was merely 2 (TD)×2 (MD), and the largest film TD stretch speed was merely 10%/s.

Example 16

(1) Preparation of Polyethylene Composition

This Example shows a polyethylene composition comprising component A, component B and component C, wherein component A and component B were prepared by polymerizations using a Ziegler-Natta catalyst (which was prepared according to Example 1 of CN101838351A), and component C was prepared by polymerization using a supported-type metallocene catalyst (which was prepared according to Example 1 of CN102453124A).

Ethylene, α-olefin, hydrogen gas and nitrogen gas were charged into a fluidized bed gas phase reactor, and the metallocene catalyst system/Ziegler-Natta catalyst system was then introduced thereto. Then, polymerizations were performed at a temperature of 84 to 88° C. under a pressure of 1.8 to 2.0 MPa to afford component A, component B and component C, respectively. During the polymerizations, the amount of the hydrogen gas added was adjusted to control the melt index of the resulting polymers, and the kind of the α-olefin as a comonomer and the amount thereof were altered to control the density of the resulting polymers.

Component A: an ethylene-1-hexylene copolymerized LLDPE, having a $MI_A$ of 2.0 g/10 min, a density $\rho_A$ of 0.913 g/cm$^3$, a $M_w/M_n$ of 6.4, and a molar content of the 1-hexylene of 8.9 mol %.

Component B: an ethylene-1-hexylene copolymerized LLDPE, having a $MI_B$ of 4.0 g/10 min, a density $\rho_B$ of 0.913 g/cm$^3$, a $M_w/M_n$ of 5.7, and a molar content of the 1-hexylene of 8.9 mol %.

Component C: an ethylene-1-butylene copolymerized LLDPE, having a $MI_C$ of 15 g/10 min, a density $\rho_C$ of 0.905 g/cm$^3$, a $M_w/M_n$ of 3.5, and a molar content of the 1-butylene of 9.1 mol %.

80 parts by weight of the component A, 10 parts by weight of the component B, and 20 parts by weight of the component C were mixed, and then 0.11 parts by weight of a PEG lubricant (available from Clariant Co., Switzerland, having a molecular weight of 10,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 160° C. and 210° C. The feedstock was melted, uniformly mixed, extruded, pelleted, and dried, to afford pellets of a polyethylene composition. The polyethylene composition was found to have a MI of 2.4 g/10 min.

(2) Preparation of Polyethylene Film

A polyethylene film was prepared by following the procedure described in Example 1, except that the above-prepared polyethylene composition pellets were used. The polyethylene film was found to have an average thickness of 25 μm, with both the upper skin layer and the lower skin layer having a thickness of 0.5 μm.

Example 17

(1) Preparation of Polyethylene Composition

This Example shows a polyethylene composition comprising component A, component B and component C, wherein component A and component B were prepared by polymerizations using a Ziegler-Natta catalyst (which was prepared according to Example 1 of CN101838351A), and component C was prepared by polymerization using a supported-type metallocene catalyst (which was prepared according to Example 1 of CN102453124A).

Ethylene, α-olefin, hydrogen gas and nitrogen gas were charged into a fluidized bed gas phase reactor, and the metallocene/Ziegler Natta catalyst system was then introduced thereto. Then, polymerizations were performed at a temperature of 84 to 88° C. under a pressure of 1.8 to 2.0 MPa to afford component A, component B and component C, respectively. During the polymerizations, the amount of the hydrogen gas added was adjusted to control the melt index of the resulting polymers, and the kind of the α-olefin as a comonomer and the amount thereof were altered to control the density of the resulting polymers.

Component A: an ethylene-1-butylene copolymerized LLDPE, having a $MI_A$ of 0.01 g/10 min, a density $\rho_A$ of 0.930 g/cm$^3$, a $M_w/M_n$ of 5.5, and a molar content of 1-butylene of 2.1 mol %.

Component B: an ethylene-1-butylene copolymerized LLDPE, having a $MI_B$ of 10.0 g/10 min, a density $\rho_B$ of 0.930 g/cm$^3$, a $M_w/M_n$ of 4.8, and a molar content of 1-butylene of 2.8 mol %.

Component C: an ethylene-1-hexylene copolymerized LLDPE, having a $MI_C$ of 60 g/10 min, a density $\rho_C$ of 0.922 g/cm$^3$, a $M_w/M_n$ of 2.9, and a molar content of 1-hexylene of 3.8 mol %.

55 parts by weight of component A, 5 parts by weight of component B, and 55 parts by weight component C were mixed, and then 3.5 parts by weight of PEG lubricant (available from Clariant Co., Switzerland, having a molecular weight of 6,000) was added thereto. Then, the mixture was homogenized in a high-speed mixer, and the homogenized materials were added into the hopper of a double screw extruder produced by W&P Company. The feedstock passed through the hopper and then entered into the barrel of the double screw extruder. During the proceeding, the temperatures of the barrel were maintained between 180° C. and 240° C. The feedstock was melted, uniformly mixed, extruded, pelleted, and dried, to afford pellets of a polyethylene composition. The polyethylene composition was found to have a MI of 0.9 g/10 min.

(2) Preparation of Polyethylene Film

A polyethylene film was prepared by following the procedure described in Example 2, except that the above-prepared polyethylene composition pellets were used. The polyethylene film was found to have an average thickness of 25 μm, with both the upper skin layer and the lower skin layer having a thickness of 1 μm.

Example 18

(1) Preparation of Polyethylene Composition

This Example shows a polyethylene composition obtained via polymerizations in a multi-reactor parallel connection equipment as shown in FIG. 1, wherein component A was polymerized by using a Ziegler-Natta catalyst (which was prepared according to Example 1 of CN101838351A) in a first reactor 1, component B was polymerized by using the same Ziegler-Natta catalyst in a second reactor 2, and component C was polymerized by using a supported-type metallocene catalyst (which was prepared according to Example 1 of CN102453124A) in a third reactor 3.

N-hexane, α-olefin, and hydrogen gas were charged into the three polymerization reactors, and the polymerization reactors were heated to predetermined polymerization temperatures. Then, ethylene monomer and the metallocene/Ziegler-Natta catalyst system were introduced simultaneously thereto. Polymerizations in the reactors 1 and 2 were performed at a temperature of 240° C. under a pressure of 14.8 MPa for 60 min to afford component A and component B, and the polymerization in the reactor 3 was performed at a temperature of 140° C. under a pressure of 2.5 MPa for 30 min to afford component C. During the polymerizations, the amount of the hydrogen gas added was adjusted to control the melt index of the resulting polymer, and the kind of the α-olefin as a comonomer and the amount thereof were altered to control the density of the resulting polymer.

In the preparation, the weight ratio of the output of component A from the first reactor 1 over unit time, $W_A$, to the output of component B from the second reactor 2 over unit time, $W_B$, to the output of component C from the first reactor 3 over unit time, $W_C$, ($W_A:W_B:W_C$) was 75:2:35.

Component A: an ethylene-1-octene copolymerized LLDPE having a $MI_A$ of 0.1 g/10 min, a density $\rho_A$ of 0.920 g/cm³, a $M_w/M_n$ of 5.8, and a molar content of 1-octene of 2.5 mol %.

Component B: an ethylene-1-butylene copolymerized LLDPE having a $MI_B$ of 12.0 g/10 min, a density $\rho_B$ of 0.920 g/cm³, a $M_w/M_n$ of 4.5, and a molar content of 1-butylene of 5.3 mol %.

Component C: an ethylene-1-butylene copolymerized LLDPE having a $MI_C$ of 25 g/10 min, a density $\rho_C$ of 0.920 g/cm³, a $M_w/M_n$ of 3.2, and a molar content of 1-butylene of 5.1 mol %.

The effluents from said reactors were separately transferred to the corresponding solid/liquid (vapor) separators 4, where phase separation was carried out, and the separated components A, B, and C were delivered to the homogenizing feed bin 5 provided with an agitator. A polyethylene wax as a lubricant (available from Honeywell Co., America) was also added to the homogenizing feed bin 5 in an amount of 1 part by weight per 100 parts by weight of the combination of the components A, B and C. The homogenized mixture from the homogenizing feed bin 5 was added into the hopper of a double screw extruder manufactured by W&P Co., and then was melt mixed, extruded, pelleted, and dried, to afford pellets of polyethylene composition. In the extruder, the barrel temperatures were maintained between 170 and 230° C. The pellets were found to have a MI of 0.6 g/10 min.

(2) Preparation of Polyethylene Film

A mono-layer polyethylene film was prepared by following the procedure described in Example 3, except that the above-prepared polyethylene composition pellets were used. The polyethylene film was found to have an average thickness of 25 μm.

Example 19

A polyethylene composition and a polyethylene film were prepared by following the procedure described in Example 16, except that in the polyethylene composition, component B was replaced with the same parts by weight of component C. That is, the polyethylene composition comprised component A and component C, but not component B. A film having an average thickness of 25 m was obtained, with both the upper skin layer and the lower skin layer having a thickness of 0.5 μm.

Example 20

A polyethylene composition was prepared by following the procedure described in Example 16, except that the amounts of the individual raw materials used in the polymerization of component A were altered so that the resultant component A had a $MI_A$ of 2.0 g/10 min, a density $\rho_A$ of 0.928 g/cm³, a $M_w/M_n$ of 5.1, and a molar content of 1-hexylene of 2.2 mol %.

A polyethylene film was prepared by following the procedure described in Example 16, except that the above-prepared polyethylene composition was used. The polyethylene film was found to have an average thickness of 25 μm, with both the upper skin layer and the lower skin layer having a thickness of 0.5 μm.

Comparative Example 14

(1) Preparation of Polyethylene Composition

Pellets of a polyethylene composition were prepared by following the procedure described in step (1) of Comparative Example 3, except that in the polymerization for producing component 1, a Ziegler-Natta catalyst (which was prepared according to Example 1 of CN101838351A) was used to replace for the metallocene catalyst system. As a result, the obtained ethylene-1-hexylene copolymerized LLDPE as component 1 was found to have a $MI_1$ of 5.0 g/10 min, a density $\rho_1$ of 0.913 g/cm³, a $M_w/M_n$ of 6.4, and a molar content of 1-hexylene of 8.6 mol %, and the obtained polyethylene composition was found to have a MI of 6.2 g/10 min.

(2) Preparation of Polyethylene Film

A polyethylene film was prepared by following the procedure described in Example 1, except that the above-prepared polyethylene composition pellets were used. In many times of attempt, the largest stretch ratio was merely 2 (TD)×2 (MD), and the largest film TD stretch speed was merely 10%/s.

Comparative Example 15

(1) Preparation of Polyethylene Composition

Pellets of a polyethylene composition were prepared by following the procedure described in step (1) of Comparative Example 4, except that in the polymerization for producing component 1, a Ziegler-Natta catalyst (which was prepared according to Example 1 of CN101838351A) was used to replace for the metallocene catalyst system. As a result, the obtained ethylene-1-butylene copolymerized LLDPE as component 1 was found to have a $MI_1$ of 0.01 g/10 min, a density $\rho_1$ of 0.930 g/cm³, a $M_w/M_n$ of 5.0, and a molar content of 1-butylene of 2.9 mol %, and the obtained polyethylene composition was found to have a MI of 0.22 g/10 min.

(2) Preparation of Polyethylene Film

A polyethylene film was prepared by following the procedure described in Example 2, except that the above-prepared polyethylene composition pellets were used. In many times of attempt, the largest stretch ratio was merely 2 (TD)×2 (MD), and the largest film TD stretch speed was merely 10%/s.

Comparative Example 16

(1) Preparation of Polyethylene Composition

Pellets of a polyethylene composition were prepared by following the procedure described in step (1) of Comparative Example 5, except that the polymerization for producing component 1 used a Ziegler-Natta catalyst (which was prepared according to Example 1 of CN101838351A) to replace for the metallocene catalyst system, and was performed at a temperature of 240° C. under a pressure of 14.8 MPa for 60 min. As a result, the obtained ethylene-1-octene copolymerized LLDPE as component 1 was found to have a MI of 0.1 g/10 min, a density $\rho_1$ of 0.920 g/cm³, a $M_w/M_n$ of 5.7, and a molar content of 1-octene of 2.5 mol %, and the obtained polyethylene composition was found to have a MI of 8.2 g/10 min.

(2) Preparation of Polyethylene Film

A polyethylene film was prepared by following the procedure described in Example 3, except that the above-prepared polyethylene composition pellets were used. In many times of attempt, the largest stretch ratio was merely 2 (TD)×2 (MD), and the largest film TD stretch speed was merely 10%/s.

Testing Example

The inventive and comparative polyethylene compositions were characterized for some properties, and the results are given in Tables 1 to 8 below.

TABLE 1

| No. | MI (g/10 min) | Density (g/cm³) | Mw (×10⁴ g/mol) | $M_w/M_n$ | $M_z/M_w$ | $M_{z+1}/M_w$ |
|---|---|---|---|---|---|---|
| Ex. 1 | 2.4 | 0.911 | 10.2 | 4.2 | 4.0 | 4.5 |
| Ex. 2 | 0.9 | 0.926 | 12.2 | 7.7 | 6.0 | 12.0 |
| Ex. 3 | 0.6 | 0.920 | 14.6 | 4.8 | 4.5 | 10.1 |
| Ex. 4 | 2.8 | 0.911 | 10.1 | 4.2 | 4.0 | 4.5 |
| Ex. 5 | 2.4 | 0.922 | 10.2 | 4.2 | 4.0 | 4.5 |
| Comp. Ex. 1 | 1.0 | 0.916 | 11.6 | 3.2 | 1.9 | 3.0 |
| Comp. Ex. 2 | 1.0 | 0.916 | 11.6 | 3.2 | 1.9 | 3.0 |
| Comp. Ex. 3 | 6.2 | 0.911 | 9.4 | 3.5 | 2.6 | 3.9 |
| Comp. Ex. 4 | 0.22 | 0.926 | 18.8 | 4.5 | 3.9 | 4.1 |
| Comp. Ex. 5 | 8.2 | 0.920 | 9.2 | 3.7 | 2.7 | 4.0 |

TABLE 2

| No. | TREF high-temperature eluting peak temperature (° C.) | TREF high-temperature eluting peak area percentage* (%) | TREF low-temperature eluting peak temperature (° C.) | TREF low-temperature eluting peak area percentage* (%) | DSC Melting temperature (° C.) |
|---|---|---|---|---|---|
| Ex. 1 | 96.1 | 9 | 63.0 | 91 | 106.1 |
| Ex. 2 | 100.3 | 35 | 86.0 | 65 | 126.5 |
| Ex. 3 | 97.5 | 26 | 86.0 | 74 | 121.0 |
| Ex. 4 | 96.1 | 8 | 63 | 92 | 105.9 |
| Ex. 5 | 97.6 | 40 | 86.1 | 60 | 127.3 |
| Comp. Ex. 1 | 97.1 | 19 | 86.0 | 81 | 113.2 |
| Comp. Ex. 2 | 97.1 | 19 | 86.0 | 81 | 113.2 |
| Comp. Ex. 3 | 95.8 | 11 | 62.0 | 89 | 107.4 |
| Comp. Ex. 4 | 97.9 | 41 | 86.2 | 59 | 127.4 |
| Comp. Ex. 5 | 97.4 | 26 | 84.5 | 74 | 122.4 |

*The TREF high-temperature eluting peak area percentage and the TREF high-temperature eluting peak area percentage are based on the total area of the high-temperature eluting peak and the low-temperature eluting peak.

TABLE 3

| No. | MI (g/10 min) | Density (g/cm³) | Mw (×10⁴ g/mol) | $M_w/M_n$ | $M_z/M_w$ | $M_{z+1}/M_w$ |
|---|---|---|---|---|---|---|
| Ex. 6 | 3.4 | 0.911 | 10.4 | 4.7 | 4.5 | 7.5 |
| Ex. 7 | 0.7 | 0.926 | 12.4 | 8.4 | 6.5 | 12.5 |
| Ex. 8 | 0.6 | 0.920 | 15.0 | 5.2 | 4.7 | 10.5 |
| Ex. 9 | 3.5 | 0.911 | 10.3 | 4.7 | 4.5 | 7.5 |
| Ex. 10 | 3.4 | 0.922 | 10.4 | 4.7 | 4.5 | 7.5 |
| Comp. Ex. 6 | 2.0 | 0.920 | 10.6 | 4.2 | 3.1 | 7.0 |
| Comp. Ex. 7 | 2.0 | 0.920 | 10.6 | 4.2 | 3.1 | 7.0 |
| Comp. Ex. 8 | 6.2 | 0.911 | 9.6 | 4.9 | 3.3 | 7.2 |
| Comp. Ex. 9 | 0.22 | 0.926 | 19.1 | 5.3 | 4.4 | 7.5 |
| Comp. Ex. 10 | 8.2 | 0.920 | 9.4 | 5.0 | 3.6 | 7.1 |

TABLE 4

| No. | TREF high-temperature eluting peak temperature (° C.) | TREF high-temperature eluting peak area* (%) | TREF low-temperature eluting peak temperature (° C.) | TREF low-temperature eluting peak area* (%) | DSC Melting temperature (° C.) |
| --- | --- | --- | --- | --- | --- |
| Ex. 6 | 96.3 | 11 | 61.5 | 89 | 108.2 |
| Ex. 7 | 101.1 | 35 | 83.9 | 65 | 126.6 |
| Ex. 8 | 98.2 | 34 | 85.0 | 66 | 123.2 |
| Ex. 9 | 96.3 | 10 | 61.5 | 90 | 108.1 |
| Ex. 10 | 101.6 | 40 | 85.7 | 60 | 128.2 |
| Comp. Ex. 6 | 97.9 | 35 | 85.5 | 65 | 122.0 |
| Camp. Ex. 7 | 97.9 | 35 | 85.5 | 65 | 122.0 |
| Comp. Ex. 8 | 96.1 | 18 | 61.5 | 82 | 113.1 |
| Comp. Ex. 9 | 102 | 42 | 85.8 | 58 | 128.4 |
| Comp. Ex. 10 | 97.5 | 35 | 83.4 | 65 | 122.6 |

*The TREF high-temperature eluting peak area percentage and the TREF high-temperature eluting peak area percentage are based on the total area of the high-temperature eluting peak and the low-temperature eluting peak.

TABLE 5

| No. | MI (g/10 min) | Density (g/cm$^3$) | Mw (×10$^4$ g/mol) | $M_w/M_n$ | $M_z/M_w$ | $M_{z+1}/M_w$ |
| --- | --- | --- | --- | --- | --- | --- |
| Ex. 11 | 2.4 | 0.911 | 10.2 | 4.3 | 4.0 | 4.5 |
| Ex. 12 | 0.7 | 0.926 | 12.2 | 7.9 | 6.2 | 11.9 |
| Ex. 13 | 0.6 | 0.920 | 14.8 | 4.9 | 4.5 | 10.1 |
| Ex. 14 | 2.8 | 0.911 | 10.1 | 4.2 | 4.0 | 4.5 |
| Ex. 15 | 2.4 | 0.922 | 10.2 | 4.2 | 4.0 | 4.5 |
| Comp. Ex. 11 | 6.2 | 0.911 | 9.6 | 3.6 | 2.5 | 3.9 |
| Comp. Ex. 12 | 0.22 | 0.926 | 18.9 | 4.7 | 3.8 | 4.1 |
| Comp. Ex. 13 | 8.2 | 0.920 | 9.3 | 3.9 | 3.0 | 4.2 |

TABLE 6

| No. | TREF high-temperature eluting peak temperature (° C.) | TREF high-temperature eluting peak area* (%) | TREF low-temperature eluting peak temperature (° C.) | TREF low-temperature eluting peak area* (%) | DSC Melting temperature (° C.) |
| --- | --- | --- | --- | --- | --- |
| Ex. 11 | 96.1 | 9 | 62.8 | 91 | 106.1 |
| Ex. 12 | 100.3 | 35 | 84.1 | 65 | 126.0 |
| Ex. 13 | 97.5 | 27 | 85.8 | 73 | 121.1 |
| Ex. 14 | 96.1 | 8 | 63.0 | 92 | 106.0 |
| Ex. 15 | 97.8 | 40 | 86.1 | 60 | 127.8 |
| Comp. Ex. 11 | 95.8 | 12 | 61.9 | 88 | 107.4 |
| Comp. Ex. 12 | 97.9 | 42 | 86.0 | 58 | 128.1 |
| Comp. Ex. 13 | 97.4 | 27 | 84.4 | 73 | 122.5 |

*The TREF high-temperature eluting peak area percentage and the TREF high-temperature eluting peak area percentage are based on the total area of the high-temperature eluting peak and the low-temperature eluting peak.

TABLE 7

| No. | MI (g/10 min) | Density (g/cm$^3$) | Mw (×10$^4$ g/mol) | $M_w/M_n$ | $M_z/M_w$ | $M_{z+1}/M_w$ |
| --- | --- | --- | --- | --- | --- | --- |
| Ex. 16 | 2.4 | 0.911 | 10.3 | 4.6 | 4.5 | 7.5 |
| Ex. 17 | 0.9 | 0.926 | 12.3 | 8.0 | 6.3 | 12.2 |
| Ex. 18 | 0.6 | 0.920 | 14.9 | 5.1 | 4.7 | 10.3 |
| Ex. 19 | 1.5 | 0.911 | 10.3 | 4.7 | 4.5 | 7.5 |
| Ex. 20 | 3.4 | 0.922 | 10.4 | 4.7 | 4.5 | 7.5 |
| Comp. Ex. 14 | 6.2 | 0.911 | 9.6 | 4.7 | 3.4 | 7.2 |
| Comp. Ex. 15 | 0.22 | 0.926 | 19.0 | 5.1 | 4.2 | 7.5 |
| Comp. Ex. 16 | 8.2 | 0.920 | 9.4 | 4.8 | 3.7 | 7.3 |

TABLE 8

| No. | TREF high-temperature eluting peak temperature (° C.) | TREF high-temperature eluting peak area* (%) | TREF low-temperature eluting peak temperature (° C.) | TREE low-temperature eluting peak area* (%) | DSC Melting temperature (° C.) |
| --- | --- | --- | --- | --- | --- |
| Ex. 16 | 96.3 | 11 | 61.8 | 89 | 108.1 |
| Ex. 17 | 101.1 | 35 | 85.8 | 65 | 126.4 |

TABLE 8-continued

| No. | TREF high-temperature eluting peak temperature (° C.) | TREF high-temperature eluting peak area* (%) | TREF low-temperature eluting peak temperature (° C.) | TREE low-temperature eluting peak area* (%) | DSC Melting temperature (° C.) |
|---|---|---|---|---|---|
| Ex. 18 | 98.2 | 32 | 85.6 | 68 | 123.0 |
| Ex. 19 | 96.3 | 10 | 61.5 | 90 | 108.1 |
| Ex. 20 | 101.8 | 40 | 85.6 | 60 | 128.2 |
| Comp. Ex. 14 | 96.1 | 16 | 61.7 | 84 | 113.2 |
| Comp. Ex. 15 | 102 | 41 | 85.9 | 59 | 128.0 |
| Comp. Ex. 16 | 97.5 | 33 | 83.5 | 67 | 122.5 |

*The TREF high-temperature eluting peak area percentage and the TREF high-temperature eluting peak area percentage are based on the total area of the high-temperature eluting peak and the low-temperature eluting peak.

The film properties of the inventive polyethylene films and the comparative polyethylene films were measured. The results are summarized in Tables 9 to 12 below.

TABLE 9

| No. | Stretching speed (%/s) | Stretch ratio (times) | Haze (%) | Modulus (GPa) MD | Modulus (GPa) TD | Tensile strength (MPa) MD | Tensile strength (MPa) TD | Elongation at break (%) MD | Elongation at break (%) TD | Puncture strength N/1 mm |
|---|---|---|---|---|---|---|---|---|---|---|
| Ex. 1 | 60 | 4 × 5 | 1.8 | 179 | 219 | 65 | 82 | 203 | 98 | 2.9 |
| Ex. 2 | 100 | 4 × 6 | 5.5 | 220 | 320 | 79 | 95 | 158 | 61 | 3.5 |
| Ex. 3 | 100 | 4 × 5 | 2.3 | 209 | 236 | 74 | 90 | 182 | 80 | 4.0 |
| Ex. 4 | 60 | 4 × 5 | 2.0 | 185 | 206 | 68 | 80 | 210 | 88 | 3.0 |
| Ex. 5 | 60 | 4 × 5 | 4.5 | 175 | 205 | 60 | 75 | 190 | 110 | 2.5 |
| Comp. Ex. 1 | — | — | — | — | — | — | — | — | — | — |
| Comp. Ex.e 2 | — | — | 8.5 | 160 | 206 | 40.2 | 36.9 | 552 | 606 | 1.5 |
| Comp. Ex. 3 | 10 | 2 × 2 | 11.5 | 155 | 145 | 30.8 | 31.0 | 780 | 802 | 0.9 |
| Comp. Ex. 4 | 10 | 2 × 2 | 18.0 | 195 | 180 | 35.0 | 33.9 | 652 | 689 | 1.0 |
| Comp. Ex. 5 | 10 | 2 × 2 | 15.8 | 140 | 153 | 33.2 | 31.9 | 757 | 706 | 1.0 |

It can be seen from the data of Table 9 that, compared with the films of the Comparative Examples, the films of the inventive Example 1-5 have the advantages of larger stretching ratios, quicker stretching speed, higher mechanical strengths, better puncturing resistance, and better optical properties. In addition, the comparison between Examples 1-5 and Comparative Examples 3-5 shows that the polyethylene compositions disclosed herein have better film forming performance.

It can be seen from the data of Table 10 that, compared with the films of the Comparative Examples, the films of the inventive Example 6-10 have the advantages of larger stretching ratios, quicker stretching speed, higher mechanical strengths, better puncturing resistance, and better optical properties. In addition, the comparison between Examples 6-10 and Comparative Examples 3-5 shows that the polyethylene compositions disclosed herein have better film forming performance.

TABLE 10

| No. | Stretching speed (%/s) | Stretch ratio (times) | Haze (%) | Modulus (GPa) MD | Modulus (GPa) TD | Tensile strength (MPa) MD | Tensile strength (MPa) TD | Elongation at break (%) MD | Elongation at break (%) TD | Puncture strength N/1 mm |
|---|---|---|---|---|---|---|---|---|---|---|
| Ex. 3 | 150 | 4 × 5 | 1.5 | 175 | 225 | 69 | 84 | 213 | 108 | 2.9 |
| Ex. 7 | 100 | 4 × 6 | 4.5 | 210 | 310 | 75 | 96 | 166 | 71 | 4.2 |
| Ex. 8 | 100 | 4 × 5 | 2.0 | 190 | 236 | 72 | 89 | 188 | 90 | 4.1 |
| Ex. 9 | 150 | 4 × 5 | 1.8 | 188 | 216 | 70 | 88 | 206 | 96 | 3.1 |
| Ex. 10 | 150 | 4 × 5 | 2.8 | 168 | 182 | 60 | 77 | 230 | 115 | 2.5 |
| Comp. Ex. 6 | — | — | — | — | — | — | — | — | — | — |
| Comp. Ex.e 7 | — | — | 7.8 | 155 | 213 | 39.5 | 40.9 | 562 | 570 | 1.3 |
| Comp. Ex. 8 | 10 | 2 × 2 | 11.7 | 156 | 135 | 30.5 | 31.8 | 880 | 902 | 0.8 |
| Comp. Ex. 9 | 10 | 2 × 2 | 13.5 | 185 | 180 | 34.0 | 32.2 | 622 | 690 | 1.0 |
| Comp. Ex. 10 | 10 | 2 × 2 | 12.8 | 160 | 143 | 33.8 | 32.9 | 758 | 776 | 1.0 |

TABLE 11

| No. | Stretching speed (%/s) | Stretch ratio (times) | Haze (%) | Modulus (GPa) MD | Modulus (GPa) TD | Tensile strength (MPa) MD | Tensile strength (MPa) TD | Elongation at break (%) MD | Elongation at break (%) TD | Puncture strength N/1 mm |
|---|---|---|---|---|---|---|---|---|---|---|
| Ex. 11 | 60 | 4 × 5 | 1.9 | 176 | 205 | 63 | 81 | 205 | 99 | 2.6 |
| Ex. 12 | 100 | 4 × 6 | 5.8 | 221 | 311 | 73 | 96 | 128 | 62 | 3.8 |
| Ex. 13 | 100 | 4 × 5 | 2.9 | 203 | 233 | 70 | 91 | 180 | 84 | 4.2 |
| Ex. 14 | 60 | 4 × 5 | 2.2 | 195 | 206 | 68 | 80 | 210 | 88 | 3.0 |
| Ex. 15 | 60 | 4 × 5 | 4.8 | 165 | 185 | 58 | 71 | 210 | 110 | 2.5 |
| Comp. Ex. 11 | 10 | 2 × 2 | 12.5 | 144 | 152 | 31.8 | 32.0 | 783 | 802 | 0.9 |
| Comp. Ex. 12 | 10 | 2 × 2 | 18.2 | 193 | 183 | 34.0 | 13.9 | 642 | 699 | 1.0 |
| Comp. Ex. 13 | 10 | 2 × 2 | 16.8 | 150 | 143 | 33.2 | 31.9 | 767 | 716 | 1.0 |

It can be seen from the data of Table 11 that, compared with the films of the Comparative Examples, the films of the inventive Example 11-15 have the advantages of larger stretching ratios, quicker stretching speed, higher mechanical strengths, and better optical properties. In addition, the comparison between Examples 11-15 and Comparative Examples 11-13 shows that the polyethylene compositions disclosed herein have better film forming performance.

TABLE 12

| No. | Stretching speed (%/s) | Stretch ratio (times) | Haze (%) | Modulus (GPa) MD | Modulus (GPa) TD | Tensile strength (MPa) MD | Tensile strength (MPa) TD | Elongation at break (%) MD | Elongation at break (%) TD | Puncture strength N/1 mm |
|---|---|---|---|---|---|---|---|---|---|---|
| Ex. 16 | 60 | 4 × 5 | 1.7 | 166 | 215 | 68 | 79 | 215 | 98 | 3.0 |
| Ex. 17 | 100 | 4 × 6 | 5.2 | 201 | 299 | 70 | 92 | 138 | 68 | 4.0 |
| Ex. 18 | 100 | 4 × 5 | 3.1 | 193 | 203 | 72 | 90 | 190 | 87 | 3.9 |
| Ex. 19 | 60 | 4 × 5 | 1.8 | 188 | 206 | 65 | 78 | 196 | 96 | 3.2 |
| Ex. 20 | 60 | 4 × 5 | 3.2 | 158 | 172 | 60 | 75 | 240 | 105 | 2.5 |
| Comp. Ex. 14 | 10 | 2 × 2 | 10.7 | 155 | 145 | 31.5 | 31.8 | 880 | 912 | 0.8 |
| Comp. Ex. 15 | 10 | 2 × 2 | 12.5 | 186 | 190 | 34.2 | 32.9 | 632 | 753 | 1.0 |
| Comp. Ex. 16 | 10 | 2 × 2 | 11.2 | 165 | 173 | 32.8 | 34.9 | 858 | 776 | 1.0 |

It can be seen from the data of Table 12 that, compared with the films of the Comparative Examples, the films of the inventive Example 16-20 have the advantages of larger stretching ratios, quicker stretching speed, higher mechanical strengths, and better optical properties. In addition, the comparison between Examples 16-20 and Comparative Examples 14-16 shows that the polyethylene compositions disclosed herein have better film forming performance.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. The present invention has been described above with reference to many embodiments and specific examples. Considering the above detailed description, many variations will be apparent for those skilled in the art. All of such variations will be within the scope of the whole purpose of the appended claims In this disclosure, whenever a composition, an element or a group of elements is preceded with the transitional phrase "comprising", it is understood that we also contemplate the same composition, element or group of elements with transitional phrases "consisting essentially of", "consisting of", "selected from the group consisting of", or "is" preceding the recitation of the composition, element, or elements, and vice versa. If the term "include," "have," "contain," or their grammatical variants are used in the disclosure or the claims, such term is intended to be non-limiting in a manner similar to the term "comprise" as "comprise" is interpreted when employed as a transitional word in a claim.

In addition, it should be understood that a specific technical feature described for an aspect and/or embodiment of the invention may be combined with another aspect and/or embodiment of the invention, unless there is a conflict in such a combination.

What is claimed is:

1. A polyethylene composition comprising an ethylene/α-olefin copolymerized linear low density polyethylene, wherein the polyethylene composition has a Mw ranging from 100,000 g/mol to 200,000 g/mol, a Mw/Mn ranging from 4.0 to 9.0, a Mz/Mw ranging from 4.0 to 7.0, and a Mz+1/Mw ranging from 4.5 to 13.5, wherein said Mw, Mn, Mz, Mz+1 are measured by gel permeation chromatography.

2. The polyethylene composition of claim 1, wherein the polyethylene composition has a Mw ranging from 100,000 g/mol to 180,000 g/mol, a Mw/Mn ranging from 4.0 to 8.5, a Mz/Mw ranging from 4.0 to 6.5, and a Mz+1/Mw ranging from 4.5 to 12.5.

3. The polyethylene composition of claim 2, having at least one of the following features (a)-(d):
(a) the polyethylene composition has such a temperature rising elution curve, obtained by analytical temperature rising elution fractionation method, that comprises a high-temperature eluting peak and a low-temperature eluting peak, wherein the high-temperature eluting peak is at a temperature ranging from 90 to 105° C., and the low-temperature eluting peak is at a temperature ranging from 50 to 90° C., and wherein the area of the high-temperature eluting peak accounts for no more than 60% of the total area of the high-temperature eluting peak and the low-temperature eluting peak, and the area of the low-temperature eluting peak accounts for at least 40% of the total area of the high-temperature eluting peak and the low-temperature eluting peak;

(d) the polyethylene composition has a melting temperature, measured by differential scanning calorimetry, ranging from 100 to 130° C.;

(c) the linear low density polyethylene has a molar content of the α-olefin comonomer ranging from 0.5 mol % to 20 mol %; and (d) the polyethylene composition has a melt index ranging from 0.1 to 20 g/10 min, measured at 190° C. under 2.16 kg load.

4. The polyethylene composition of claim 2, having at least one of the following features (a)-(d):

(a) the polyethylene composition has such a temperature rising elution curve, obtained by analytical temperature rising elution fractionation method, that comprises a high-temperature eluting peak and a low-temperature eluting peak, wherein the high-temperature eluting peak is at a temperature ranging from 95 to 100° C., and the low-temperature eluting peak is at a temperature ranging from 60 to 90° C., and wherein the area of the high-temperature eluting peak accounts for no more than 50% of the total area of the high-temperature eluting peak and the low-temperature eluting peak, and the area of the low-temperature eluting peak accounts for at least 50% of the total area of the high-temperature eluting peak and the low-temperature eluting peak;

(b) the polyethylene composition has a melting temperature, measured by differential scanning calorimetry, ranging from 105 to 128° C.;

(c) the linear low density polyethylene has a molar content of the α-olefin comonomer ranging from 2 mol % to 10 mol %; and (d) the polyethylene composition has a melt index ranging from 0.5 to 10 g/10 min, measured at 190° C. under 2.16 kg load.

5. The polyethylene composition of claim 2, wherein the polyethylene composition comprises component A, component C, and optionally component B, wherein the component A comprises an ethylene/α-olefin copolymerized linear low density polyethylene having a melt index $MI_A$ ranging from 0.01 to 2 g/10 min and a density $\rho_A$ ranging from 0.880 to 0.936 g/cm³; the component B comprises an ethylene/α-olefin copolymerized linear low density polyethylene having a melt index $MI_B$ ranging from 2.1 to 9.9 g/10 min and a density $\rho_B$ ranging from 0.910 to 0.930 g/cm³; and the component C comprises an ethylene/α-olefin copolymerized linear low density polyethylene having a melt index $MI_C$ ranging from 10 to 80 g/10 min and a density $\rho_C$ ranging from 0.880 to 0.930 g/cm³.

6. The polyethylene composition of claim 5, having at least one of the following features (a)-(g):

(a) the component A has a melt index $MI_A$ ranging from 0.01 to 1.5 g/10 min, the component B has a melt index $MI_B$ ranging from 3 to 8 g/10 min, and the component C has a melt index $MI_C$ ranging from 10 to 60 g/10 min;

(b) the component A has a density $\rho_A$ ranging from 0.910 to 0.930 g/cm³, the component B has a density $\rho_B$ ranging from 0.913 to 0.928 g/cm³, and the component C has a density $\rho_C$ ranging from 0.905 to 0.928 g/cm³;

(c) the densities $\rho_A$, $\rho_B$ and $\rho_C$ of the components A, B and C satisfy: $-0.04 \leq \rho_A - \rho_B \leq 0.02$ and $-0.04 \leq \rho_A - \rho_C \leq 0.02$;

(d) the component A and the component B have, each independently, a molecular weight distribution index $M_w/M_n$ of no more than 4.5, and the component C has a molecular weight distribution index $M_w/M_n$ of no more than 8.0;

(e) the component A and the component B each are produced by polymerization using a metallocene catalyst, and the component C is produced by polymerization using a Ziegler-Natta catalyst;

(f) the α-olefins of the components A, B and C are, each independently, at least one chosen from $C_3$-$C_{20}$ olefins; and (g) the components A, B and C have, each independently, a molar content of the α-olefin ranging from 0.2 to 15 mol %.

7. The polyethylene composition of claim 5, wherein in the polyethylene composition, the amount of component A, $W_A$, ranging from 25-90 parts by weight, the amount of component B, $W_B$, ranges from 0.1-10 parts by weight, and the amount of component C, $W_C$, ranges from 10-75 parts by weight.

8. The polyethylene composition of claim 7, wherein in the polyethylene composition, the amount of component A ranges from 30-80 parts by weight, the amount of component B ranges from 0.5-8 parts by weight, and the amount of component C ranges from 20-70 parts by weight.

9. The polyethylene composition of claim 7, wherein the amount $W_A$, the amount $W_C$, and the melt index $MI_A$ satisfy: $5.2 \times \lg MI_A + 11.6 \geq W_A/W_C \geq 0.9 \times \lg MI_A + 2.1$.

10. The polyethylene composition of claim 7, wherein the amount $W_A$, the amount $W_C$, and the melt index $MI_A$ satisfy: $2.9 \times \lg MI_A + 6.8 \geq W_A/W_C \geq 1.1 \times \lg MI_A + 2.7$.

11. The polyethylene composition of claim 7, wherein the amount of component B is no more than 35 wt %, based on the total weight of the polyethylene composition.

12. The polyethylene composition of claim 1, wherein the polyethylene composition has a Mw ranging from 100,000 g/mol to 180,000 g/mol, a Mw/Mn ranging from 4.0 to 8.0, a Mz/Mw ranging from 4.0 to 6.0, and a Mz+1/Mw ranging from 4.5 to 12.5.

13. The polyethylene composition of claim 12, having at least one of the following features (a)-(d):

(a) the polyethylene composition has such a temperature rising elution curve, obtained by analytical temperature rising elution fractionation method, that comprises a high-temperature eluting peak and a low-temperature eluting peak, wherein the high-temperature eluting peak is at a temperature ranging from 90 to 105° C., and the low-temperature eluting peak is at a temperature ranging from 50 to 90° C., and wherein the area of the high-temperature eluting peak accounts for no more than 60% of the total area of the high-temperature eluting peak and the low-temperature eluting peak, and the area of the low-temperature eluting peak accounts for at least 40% of the total area of the high-temperature eluting peak and the low-temperature eluting peak;

(b) the polyethylene composition has a melting temperature, measured by differential scanning calorimetry, ranging from 100 to 130° C.;

(c) the linear low density polyethylene has a molar content of the α-olefin comonomer ranging from 0.5 mol % to 20 mol %; and (d) the polyethylene composition has a melt index ranging from 0.1 to 20 g/10 min, measured at 190° C. under 2.16 kg load.

14. The polyethylene composition of claim 12, having at least one of the following features (a)-(d):
  (a) the polyethylene composition has such a temperature rising elution curve, obtained by analytical temperature rising elution fractionation method, that comprises a high-temperature eluting peak and a low-temperature eluting peak, wherein the high-temperature eluting peak is at a temperature ranging from 95 to 100° C., and the low-temperature eluting peak is at a temperature ranging from 60 to 90° C., and wherein the area of the high-temperature eluting peak accounts for no more than 50% of the total area of the high-temperature eluting peak and the low-temperature eluting peak, and the area of the low-temperature eluting peak accounts for at least 50% of the total area of the high-temperature eluting peak and the low-temperature eluting peak;
  (b) the polyethylene composition has a melting temperature, measured by differential scanning calorimetry, ranging from 105 to 128° C.;
  (c) the linear low density polyethylene has a molar content of the α-olefin comonomer ranging from 2 mol % to 10 mol %; and
  (d) the polyethylene composition has a melt index ranging from 0.5 to 10 g/10 min, measured at 190° C. under 2.16 kg load.

15. The polyethylene composition of claim 12, wherein the polyethylene composition comprises component A, component C and optionally component B, wherein the component A comprises an ethylene/α-olefin copolymerized linear low density polyethylene having a melt index $MI_A$ ranging from 0.01 to 2 g/10 min and a density $\rho_A$ ranging from 0.880 to 0.936 g/cm$^3$; the component B comprises an ethylene/α-olefin copolymerized linear low density polyethylene having a melt index $MI_B$ ranging from 2.1 to 14.9 g/10 min and a density $\rho_B$ ranging from 0.910 to 0.930 g/cm$^3$; and the component C comprises an ethylene/α-olefin copolymerized linear low density polyethylene having a melt index $MI_C$ ranging from 15 to 150 g/10 min and a density $\rho_C$ ranging from 0.880 to 0.930 g/cm$^3$, and wherein the melt indexes are measured at 190° C. under 2.16 kg load.

16. The polyethylene composition of claim 15, having at least one of the following features (a)-(g):
  (a) the component A has a melt index $MI_A$ ranging from 0.01 to 1.5 g/10 min, the component B has a melt index $MI_B$ ranging from 3 to 10 g/10 min, and the component C has a melt index $MI_C$ ranging from 15 to 100 g/10 min;
  (b) the component A has a density $\rho_A$ ranging from 0.910 to 0.930 g/cm$^3$, the component B has a density $\rho_B$ ranging from 0.913 to 0.928 g/cm$^3$, and the component C has a density $\rho_C$ ranging from 0.905 to 0.928 g/cm$^3$;
  (c) the densities $\rho_A$, $\rho_B$ and $\rho_C$ of the components A, B and C satisfy: $-0.04 \leq \rho_A - \rho_B \leq 0.02$ and $-0.04 \leq \rho_A - \rho_C \leq 0.02$;
  (d) the components A, B and C have, each independently, a molecular weight distribution index $M_w/M_n$ of no more than 4.5;
  (e) the components A, B and C each are produced by polymerization using a metallocene catalyst;
  (f) the α-olefins of the components A, B and C are, each independently, at least one chosen from $C_3$-$C_{20}$ olefins; and
  (g) the components A, B and C have, each independently, a molar content of the α-olefin ranging from 0.2 to 15 mol %.

17. The polyethylene composition of claim 15, wherein in the polyethylene composition, the amount of component A, $W_A$, ranges from 25-90 parts by weight, the amount of component B, $W_B$, ranges from 0.1-10 parts by weight, and the amount of component C, $W_C$, ranges from 10-75 parts by weight.

18. The polyethylene composition of claim 17, wherein in the polyethylene composition, the amount of component A ranges from 30-80 parts by weight, the amount of component B ranges from 0.5-8 parts by weight, and the amount of component C ranges from 20-70 parts by weight.

19. The polyethylene composition of claim 17, wherein the amount $W_A$, the amount $W_C$, and the melt index $MI_A$ satisfy: $5.2 \times \lg MI_A + 11.6 \geq W_A/W_C \geq 0.9 \times \lg MI_A + 2.1$.

20. The polyethylene composition of claim 17, wherein the amount $W_A$, the amount $W_C$, and the melt index $MI_A$ satisfy: $2.9 \times \lg MI_A + 6.8 \geq N_A/W_C \geq 1.1 \times \lg MI_A + 2.7$.

21. The polyethylene composition of claim 17, wherein the amount of component B is no more than 35 wt %, based on the total weight of the polyethylene composition.

22. The polyethylene composition of claim 1, wherein the polyethylene composition has a Mw ranging from 100,000 g/mol to 200,000 g/mol, a Mw/Mn ranging from 4.5 to 9.0, a Mz/Mw ranging from 4.5 to 7.0, and a Mz+1/Mw ranging from 7.5 to 13.5.

23. The polyethylene composition of claim 22, having at least one of the following features (a)-(d):
  (a) the polyethylene composition has such a temperature rising elution curve, obtained by analytical temperature rising elution fractionation method, that comprises a high-temperature eluting peak and a low-temperature eluting peak, wherein the high-temperature eluting peak is at a temperature ranging from 90 to 110° C., and the low-temperature eluting peak is at a temperature ranging from 50 to 90° C., and wherein the area of the high-temperature eluting peak accounts for no more than 80% of the total area of the high-temperature eluting peak and the low-temperature eluting peak, and the area of the low-temperature eluting peak accounts for at least 20% of the total area of the high-temperature eluting peak and the low-temperature eluting peak;
  (b) the polyethylene composition has a melting temperature, measured by differential scanning calorimetry, ranging from 100 to 130° C.;
  (c) the linear low density polyethylene has a molar content of the α-olefin comonomer ranging from 0.5 mol % to 20 mol %; and
  (d) the polyethylene composition has a melt index ranging from 0.1 to 20 g/10 min, measured at 190° C. under 2.16 kg load.

24. The polyethylene composition of claim 22, having at least one of the following features (a)-(d):
  (a) the polyethylene composition has such a temperature rising elution curve, obtained by analytical temperature rising elution fractionation method, that comprises a high-temperature eluting peak and a low-temperature eluting peak, wherein the high-temperature eluting peak is at a temperature ranging from 95 to 105° C., and the low-temperature eluting peak is at a temperature ranging from 60 to 90° C., and wherein the area of the high-temperature eluting peak accounts for no more than 70% of the total area of the high-temperature eluting peak and the low-temperature eluting peak, and the area of the low-temperature eluting peak accounts for at least 30% of the total area of the high-temperature eluting peak and the low-temperature eluting peak;
  (b) the polyethylene composition has a melting temperature, measured by differential scanning calorimetry, ranging from 110 to 128° C.;

(c) the linear low density polyethylene has a molar content of the α-olefin comonomer ranging from 2 mol % to 10 mol %; and (d) the polyethylene composition has a melt index ranging from 0.5 to 10 g/10 min, measured at 190° C. under 2.16 kg load.

25. The polyethylene composition of claim 22, wherein the polyethylene composition comprises component A, component C, and optionally component B, wherein the component A comprises an ethylene/α-olefin copolymerized linear low density polyethylene having a melt index $MI_A$ ranging from 0.01 to 3.5 g/10 min and a density $\rho_A$ ranging from 0.880 to 0.936 g/cm$^3$; the component B comprises an ethylene/α-olefin copolymerized linear low density polyethylene having a melt index $MI_B$ ranging from 3.6 to 9.9 g/10 min and a density $\rho_B$ ranging from 0.910 to 0.930 g/cm$^3$; and the component C comprises an ethylene/α-olefin copolymerized linear low density polyethylene having a melt index $MI_C$ ranging from 10 to 80 g/10 min and a density $\rho_C$ ranging from 0.880 to 0.930 g/cm$^3$.

26. The polyethylene composition of claim 25, having at least one of the following features (a)-(g):
(a) the component A has a melt index $MI_A$ ranging from 0.01 to 3 g/10 min, the component B has a melt index $MI_B$ ranging from 4 to 8 g/10 min, and the component C has a melt index $MI_C$ ranging from 10 to 60 g/10 min;
(b) the component A has a density $\rho_A$ ranging from 0.910 to 0.930 g/cm$^3$, the component B has a density $\rho_B$ ranging from 0.913 to 0.928 g/cm$^3$, and the component C has a density $\rho_C$ ranging from 0.905 to 0.928 g/cm$^3$;
(c) the densities $\rho_A$, $\rho_B$ and $\rho_C$ of components A, B and C satisfy: $-0.04 \leq \rho_A - \rho_B \leq 0.02$ and $-0.04 \leq \rho_A - \rho_C \leq 0.02$;
(d) the components A, B and C have, each independently, a molecular weight distribution index $M_w/M_n$ of no more than 8.0;
(e) the components A, B and C each are produced by polymerization using a Ziegler-Natta catalyst;
(f) the α-olefins of the components A, B and C are, each independently, at least one chosen from $C_3$-$C_{20}$ olefins; and
(g) the components A, B and C have, each independently, a molar content of the α-olefin ranging from 0.2 to 15 mol %.

27. The polyethylene composition of claim 25, wherein in the polyethylene composition, the amount of component A, $W_A$, ranges from 25-90 parts by weight, the amount of component B, $W_B$, ranges from 0.1-10 parts by weight, and the amount of component C, $W_C$, ranges from 10-75 parts by weight.

28. The polyethylene composition of claim 27, wherein in the polyethylene composition, the amount of component A ranges from 30-80 parts by weight, the amount of component B ranges from 0.5-8 parts by weight, and the amount of component C ranges from 20-70 parts by weight.

29. The polyethylene composition of claim 27, wherein the amount $W_A$, the amount $W_C$, and the melt index $MI_A$ satisfy: $4.6 \times \lg MI_A + 10.4 \geq W_A/W_C \geq 0.18 \times \lg MI_A + 0.7$.

30. The polyethylene composition of claim 27 wherein the amount $W_A$, the amount $W_C$, and the melt index $MI_A$ satisfy: $1.8 \times \lg MI_A + 4.7 \geq W_A/W_C \geq 0.22 \times \lg MI_A + 0.9$.

31. The polyethylene composition of claim 27, wherein the amount of component B is no more than 35 wt %, based on the total weight of the polyethylene composition.

32. The polyethylene composition of claim 1, wherein the polyethylene composition has a Mw ranging from 100,000 g/mol to 200,000 g/mol, a Mw/Mn ranging from 4.5 to 8.5, a Mz/Mw ranging from 4.5 to 6.5, and a Mz+1/Mw ranging from 7.5 to 13.0.

33. The polyethylene composition of claim 32, having at least one of the following features (a)-(d):
(a) the polyethylene composition has such a temperature rising elution curve, obtained by analytical temperature rising elution fractionation method, that comprises a high-temperature eluting peak and a low-temperature eluting peak, wherein the high-temperature eluting peak is at a temperature ranging from 90 to 110° C., and the low-temperature eluting peak is at a temperature ranging from 50 to 90° C., and wherein the area of the high-temperature eluting peak accounts for no more than 70% of the total area of the high-temperature eluting peak and the low-temperature eluting peak, and the area of the low-temperature eluting peak accounts for at least 30% of the total area of the high-temperature eluting peak and the low-temperature eluting peak;
(b) the polyethylene composition has a melting temperature, measured by differential scanning calorimetry, ranging from 100 to 130° C.;
(c) the linear low density polyethylene has a molar content of the α-olefin comonomer ranging from 0.5 mol % to 20 mol %; and
(d) the polyethylene composition has a melt index ranging from 0.1 to 20 g/10 min, measured at 190° C. under 2.16 kg load.

34. The polyethylene composition of claim 32, having at least one of the following features:
(a) the polyethylene composition has such a temperature rising elution curve, obtained by analytical temperature rising elution fractionation method, that comprises a high-temperature eluting peak and a low-temperature eluting peak, wherein the high-temperature eluting peak is at a temperature ranging from 95 to 100° C., and the low-temperature eluting peak is at a temperature ranging from 60 to 90° C., and wherein the area of the high-temperature eluting peak accounts for no more than 60% of the total area of the high-temperature eluting peak and the low-temperature eluting peak, and the area of the low-temperature eluting peak accounts for at least 40% of the total area of the high-temperature eluting peak and the low-temperature eluting peak;
(b) the polyethylene composition has a melting temperature, measured by differential scanning calorimetry, ranging from 110 to 130° C.;
(c) the linear low density polyethylene has a molar content of the α-olefin comonomer ranging from 2 mol % to 10 mol %; and
(d) the polyethylene composition has a melt index ranging from 0.5 to 10 g/10 min, measured at 190° C. under 2.16 kg load.

35. The polyethylene composition of claim 32, wherein the polyethylene composition comprises component A, component C, and optionally component B, wherein the component A comprises an ethylene/α-olefin copolymerized linear low density polyethylene having a melt index $MI_A$ ranging from 0.01 to 3.5 g/10 min and a density $\rho_A$ ranging from 0.880 to 0.936 g/cm$^3$; the component B comprises an ethylene/α-olefin copolymerized linear low density polyethylene having a melt index $MI_B$ ranging from 3.6 to 14.9 g/10 min and a density $\rho_B$ ranging from 0.910 to 0.930 g/cm$^3$; and the component C comprises an ethylene/α-olefin copolymerized linear low density polyethylene having a melt index $MI_C$ ranging from 15 to 150 g/10 min and a density $\rho_C$ ranging from 0.880 to 0.930 g/cm$^3$.

36. The polyethylene composition of claim 35, having at least one of the following features:
   (a) the component A has a melt index $MI_A$ ranging from 0.01 to 3 g/10 min, the component B has a melt index $MI_B$ ranging from 4 to 10 g/10 min, and the component C has a melt index $MI_C$ ranging from 15 to 100 g/10 min;
   (b) the component A has a density $\rho_A$ ranging from 0.910 to 0.930 g/cm$^3$, the component B has a density $\rho_B$ ranging from 0.913 to 0.928 g/cm$^3$, and the component C has a density $\rho_C$ ranging from 0.905 to 0.928 g/cm$^3$;
   (c) the densities $\rho_A$, $\rho_B$ and $\rho_C$ of the components A, B and C satisfy: $-0.04 \leq \rho_A - \rho_B \leq 0.02$ and $-0.04 \leq \rho_A - \rho_C \leq 0.02$;
   (d) the components A and B have, each independently, a molecular weight distribution index $M_w/M_n$ of no more than 8.0, and the component C has a molecular weight distribution index $M_w/M_n$ of no more than 4.5;
   (e) the components A and B each are produced by polymerization using a Ziegler-Natta catalyst, and the component C is produced by a polymerization using a metallocene catalyst;
   (f) the α-olefins of the components A, B and C are, each independently, at least one chosen from $C_3$-$C_{20}$ olefins; and
   (g) the components A, B and C have, each independently, a molar content of the α-olefin ranging from 0.2 to 15 mol %.

37. The polyethylene composition of claim 35, wherein in the polyethylene composition, the amount of component A, $W_A$, ranges from 25-90 parts by weight, the amount of component B, $W_B$, ranges from 0.1-10 parts by weight, and the amount of component C, $W_C$, ranges from 10-75 parts by weight.

38. The polyethylene composition of claim 37, wherein in the polyethylene composition, the amount of component A ranges from 30-80 parts by weight, the amount of component B ranges from 0.5-8 parts by weight, and the amount of component C ranges from 20-70 parts by weight.

39. The polyethylene composition of claim 37, wherein the amount $W_A$, the amount $W_C$, and the melt index $MI_A$ satisfy: $4.6 \times \lg MI_A + 10.4 \geq W_A/W_C \geq 0.18 \times \lg MI_A + 0.7$.

40. The polyethylene composition of claim 37, wherein the amount $W_A$, the amount $W_C$, and the melt index $MI_A$ satisfy: $1.8 \times \lg MI_A + 4.7 \geq W_A/W_C \geq 0.22 \times \lg MI_A + 0.9$.

41. The polyethylene composition of claim 37, wherein the amount of component B is no more than 35 wt %, based on the total weight of the polyethylene composition.

42. The polyethylene composition of f claim 1, further comprising a lubricant in an amount ranging from 0.05 to 5 parts by weight per 100 parts by weight of all polyethylene resins in the composition.

43. A film comprising at least one polyethylene layer formed from the polyethylene composition of claim 1.

44. The film of claim 43, wherein the film has a complex structure comprising an upper skin layer, a core layer and a lower skin layer, and wherein at least the core layer comprises the polyethylene layer formed from the polyethylene composition.

45. The film of claim 43, wherein the film is a biaxially oriented film prepared through a tenter frame process.

46. The film of claim 45, wherein the biaxially stretching method employs a machine direction stretch ratio of at least 4, a transverse direction stretch ratio of at least 5, and a transverse direction stretching speed of at least 50%/s.

47. The film of claim 43, wherein the film has a thickness ranging from 10 to 200 μm.

48. The film of claim 45, wherein the biaxially oriented film has a machine direction tensile strength of at least 55 MPa, a transverse direction tensile strength of at least 65 MPa, a puncture strength of at least 2.5N, and an elongation at break of no more than 350%.

* * * * *